(12) United States Patent
Smekalov et al.

(10) Patent No.: US 12,197,340 B2
(45) Date of Patent: Jan. 14, 2025

(54) APPARATUS AND METHOD FOR CACHE INVALIDATION

(71) Applicant: Arm Limited, Cambridge (GB)

(72) Inventors: Anton Smekalov, Manchester (GB); Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 42 days.

(21) Appl. No.: 17/978,400

(22) Filed: Nov. 1, 2022

(65) Prior Publication Data
US 2024/0143510 A1    May 2, 2024

(51) Int. Cl.
*G06F 12/0891*  (2016.01)
(52) U.S. Cl.
CPC .... *G06F 12/0891* (2013.01); *G06F 2212/604* (2013.01)
(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | | |
|---|---|---|---|---|
| 4,315,312 A | * | 2/1982 | Schmidt | G06F 12/0864 711/172 |
| 6,941,442 B2 | * | 9/2005 | Devereux | G06F 12/1027 711/E12.075 |

(Continued)

OTHER PUBLICATIONS 3.2. Cache Lines and Cache Size; Jan. 11, 2022; retrieved from https://web.archive.org/web/20220111225915/https://www.nic.uoregon.edu/~khuck/ts/acumem-report/manual_html/ch03s02.html on Feb. 6, 2024 (Year: 2022).*

(Continued)

*Primary Examiner* — Daniel C. Chappell
(74) *Attorney, Agent, or Firm* — NIXON & VANDERHYE P.C.

(57) ABSTRACT

There is provided an apparatus, medium and method for cache invalidation. The apparatus comprises a cache having a plurality of entries grouped into a plurality of entry sets. Each entry of the plurality of entries identifies an address range having one of a plurality of predetermined address range sizes. The apparatus further comprises cache invalidation circuitry responsive to a cache invalidation request indicating an address invalidation range to trigger invalidation of entries in the cache that overlap the address invalidation range. The cache invalidation circuitry is configured to operate in one of a plurality of invalidation modes based on the address invalidation range and cache occupancy information indicating address range sizes identified by the plurality of entries in the cache. The plurality of invalidation modes comprise: an entry-driven invalidation mode in which the cache invalidation circuitry is configured, for each entry of the plurality of entries and in response to a determination that the address invalidation range overlaps the address range identified by that entry, to invalidate that entry; and an invalidation-range-driven invalidation mode in which the cache invalidation circuitry is configured to generate a set of address range sizes based on the address range sizes indicated in the cache occupancy information and, for each given address range size, to generate one or more cache indexes from the address invalidation range in dependence on the given address range size, each of the cache indexes identifying a corresponding entry set of the plurality of entry sets, and for each corresponding entry set to invalidate entries in dependence on whether the address range identified by those entries overlaps the address invalidation range.

20 Claims, 15 Drawing Sheets

(58) Field of Classification Search
CPC .............. G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2003/0697; G06F 2009/3883; G06F
2009/45562–45595; G06F 2015/761–768;
G06F 2201/00–885; G06F 2206/00–20;
G06F 2209/00–549; G06F 2211/00–902;
G06F 2212/00–7211; G06F
2213/00–4004; G06F 2216/00–17; G06F
2221/00–2153; G06N 3/00–126; G06N
5/00–048; G06N 7/00–08; G06N 10/00;
G06N 20/00–20; G06N 99/00–007; G06T
1/00–60; G06V 30/00–43; G11B
20/00–24; G11B 33/00–1493; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | | |
|---|---|---|---|---|
| 7,895,410 | B1* | 2/2011 | Wu | G06F 12/1009 |
| | | | | 711/208 |
| 8,977,821 | B2* | 3/2015 | Bhoria | G06F 12/0811 |
| | | | | 711/144 |
| 9,880,937 | B2* | 1/2018 | Fan | G06F 12/0864 |
| 10,810,128 | B2* | 10/2020 | Misra | G06F 12/0891 |
| 10,877,890 | B2* | 12/2020 | Alameldeen | G06F 12/0824 |
| 2003/0009643 | A1* | 1/2003 | Arimilli | G06F 12/0831 |
| | | | | 711/119 |
| 2011/0314224 | A1* | 12/2011 | Piry | G06F 12/0808 |
| | | | | 711/E12.017 |
| 2015/0016172 | A1* | 1/2015 | Loh | G06F 3/0608 |
| | | | | 365/51 |
| 2019/0294551 | A1* | 9/2019 | Abhishek Raja | G06F 12/1027 |
| 2019/0384714 | A1* | 12/2019 | Kaleeluddin | G06F 12/0891 |
| 2020/0218471 | A1* | 7/2020 | Chen | G06F 3/0659 |
| 2020/0218665 | A1* | 7/2020 | Swaine | G06F 12/1036 |
| 2020/0272557 | A1* | 8/2020 | Campbell | G06F 11/3636 |
| 2021/0311884 | A1* | 10/2021 | Grocutt | G06F 3/0673 |
| 2021/0311997 | A1* | 10/2021 | Grocutt | G06F 16/90339 |
| 2022/0214973 | A1* | 7/2022 | Richardson | G06F 9/3887 |

OTHER PUBLICATIONS

A. Gupta and W. .-D. Weber, "Cache invalidation patterns in shared-memory multiprocessors," in IEEE Transactions on Computers , vol. 41, No. 7, pp. 794-810, Jul. 1992, doi: 10.1109/12.256449. (Year: 1992).*

X. Wang, P. Jin, Y. Luo and Z. Chu, "Range Cache: An Efficient Cache Component for Accelerating Range Queries on LSM-Based Key-Value Stores," 2024 IEEE 40th International Conference on Data Engineering (ICDE), Utrecht, Netherlands, 2024, pp. 488-500, doi: 10.1109/ICDE60146.2024.00044. (Year: 2024).*

N. Zhang, H. Sun, K. Sun, W. Lou and Y. T. Hou, "CacheKit: Evading Memory Introspection Using Cache Incoherence," 2016 IEEE European Symposium on Security and Privacy (EuroS&P), Saarbruecken, Germany, 2016, pp. 337-352, doi: 10.1109/EuroSP.2016.34. (Year: 2016).*

* cited by examiner

APPARATUS AND METHOD FOR CACHE INVALIDATION

TECHNICAL FIELD

The present invention relates to data processing. More particularly the present invention relates to an apparatus and method for cache invalidation.

BACKGROUND

A cache storage (also referred to as a cache herein) can be arranged to store data for access by a processing element, enabling access to that data with improved performance, and reduced power consumption, when compared with accessing that data from memory. In some implementations, a cache may be subjected to invalidation requests seeking to invalidate the data held in one or more entries of the cache.

SUMMARY

In some example configurations described herein there is an apparatus comprising:
a cache comprising a plurality of entries grouped into a plurality of entry sets, each of the plurality of entry sets comprising one or more of the plurality of entries, wherein each entry of the plurality of entries identifies an address range having a corresponding address range size of a plurality of predetermined address range sizes;
cache invalidation circuitry responsive to a cache invalidation request indicating an address invalidation range to trigger invalidation of entries in the cache that overlap the address invalidation range, wherein the cache invalidation circuitry is configured to operate in an invalidation mode of a plurality of invalidation modes and to perform a selection of the invalidation mode based on the address invalidation range and cache occupancy information indicating which address range sizes of the plurality of predetermined address range sizes are identified by the plurality of entries in the cache, wherein the plurality of invalidation modes comprise:
an entry-driven invalidation mode in which the cache invalidation circuitry is configured, for each entry of the plurality of entries and in response to a determination that the address invalidation range overlaps the address range identified by that entry, to invalidate that entry, and
an invalidation-range-driven invalidation mode in which the cache invalidation circuitry is configured to generate a set of address range sizes based on the address range sizes indicated in the cache occupancy information and, for each given address range size of the set of address range sizes, to generate one or more cache indexes from the address invalidation range in dependence on the given address range size, each of the cache indexes identifying a corresponding entry set of the plurality of entry sets, and for each corresponding entry set to invalidate one or more entries of the corresponding entry set in dependence on whether the address range identified by those entries overlaps the address invalidation range.

In some example configurations described herein there is a method of operating an apparatus comprising a cache configured to store a plurality of entries grouped into a plurality of entry sets, each of the plurality of entry sets comprising one or more of the plurality of entries, wherein each entry of the plurality of entries identifies an address range having a corresponding address range size of a plurality of predetermined address range sizes, the method comprising:
in response to a cache invalidation request indicating an address invalidation range, triggering invalidation of entries in the cache that overlap the address invalidation range in an invalidation mode of a plurality of invalidation modes and performing a selection of the invalidation mode based on the address invalidation range and cache occupancy information indicating which address range sizes of the plurality of predetermined address range sizes are identified by the plurality of entries in the cache, wherein the plurality of invalidation modes comprise:
an entry-driven invalidation mode comprising, for each entry of the plurality of entries and in response to a determination that the address invalidation range overlaps the address range identified by that entry, invalidating that entry; and
an invalidation-range-driven invalidation mode comprising generating a set of address range sizes based on the address range sizes indicated in the cache occupancy information and, for each given address range size of the set of address range sizes, generating one or more cache indexes from the address invalidation range in dependence on the given address range size, each of the cache indexes identifying a corresponding entry set of the plurality of entry sets, and for each corresponding entry set invalidating one or more entries of the corresponding entry set in dependence on whether the address range identified by those entries overlaps the address invalidation range.

In some example configurations described herein there is a non-transitory computer-readable medium to store computer-readable code for fabrication of an apparatus comprising:
cache configured to store a plurality of entries grouped into a plurality of entry sets, each of the plurality of entry sets comprising one or more of the plurality of entries, wherein each entry of the plurality of entries identifies an address range having a corresponding address range size of a plurality of predetermined address range sizes;
cache invalidation circuitry responsive to a cache invalidation request indicating an address invalidation range to trigger invalidation of entries in the cache that overlap the address invalidation range, wherein the cache invalidation circuitry is configured to operate in an invalidation mode of a plurality of invalidation modes and to perform a selection of the invalidation mode based on the address invalidation range and cache occupancy information indicating which address range sizes of the plurality of predetermined address range sizes are identified by the plurality of entries in the cache, wherein the plurality of invalidation modes comprise:
an entry-driven invalidation mode in which the cache invalidation circuitry is configured, for each entry of the plurality of entries and in response to a determination that the address invalidation range overlaps the address range identified by that entry, to invalidate that entry; and
an invalidation-range-driven invalidation mode in which the cache invalidation circuitry is configured to generate a set of address range sizes based on the address range sizes indicated in the cache occupancy information and, for each given address range size of the set of address range sizes, to generate one or more cache indexes from the address invalidation range in dependence on the given address range size, each of the cache indexes identifying a corresponding entry set of the plurality of entry sets, and for each corresponding entry set to invalidate one or more entries of the corresponding entry set in dependence on whether the address range identified by those entries overlaps the address invalidation range.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
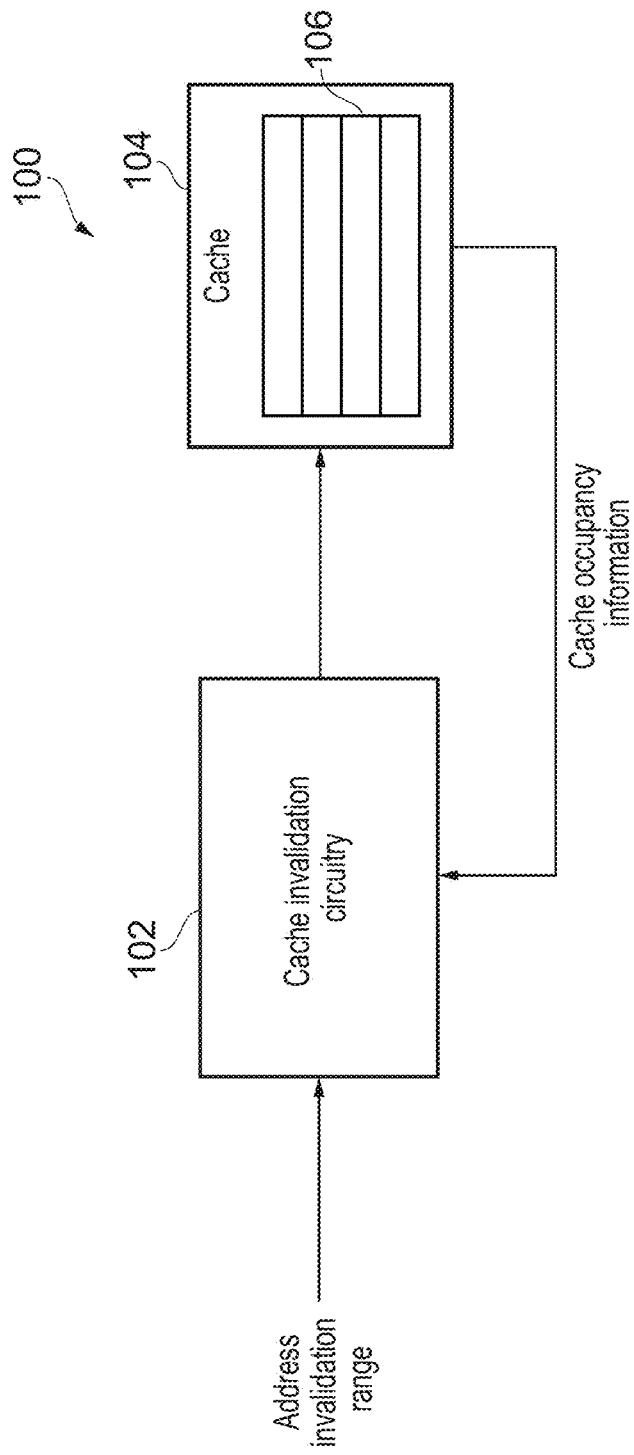
FIG. 1 schematically illustrates an apparatus according to various configurations of the present techniques.

Before discussing the configurations with reference to the accompanying figures, the following description of configurations is provided.

In accordance with one example configuration there is provided an apparatus comprising a cache. The cache comprises a plurality of entries grouped into a plurality of entry sets, where each of the plurality of entry sets comprises one or more of the plurality of entries. Each entry of the plurality of entries identifies an address range having a corresponding address range size of a plurality of predetermined address range sizes. The apparatus also comprises cache invalidation circuitry responsive to a cache invalidation request indicating an address invalidation range to trigger invalidation of entries in the cache that overlap the address invalidation range. The cache invalidation circuitry is configured to operate in an invalidation mode of a plurality of invalidation modes and to perform a selection of the invalidation mode based on the address invalidation range and cache occupancy information indicating which address range sizes of the plurality of predetermined address range sizes are identified by the plurality of entries in the cache. The plurality of invalidation modes comprises an entry-driven invalidation mode in which the cache invalidation circuitry is configured, for each entry of the plurality of entries and in response to a determination that the address invalidation range overlaps the address range identified by that entry, to invalidate that entry. The plurality of invalidation modes also comprises an invalidation-range-driven invalidation mode in which the cache invalidation circuitry is configured to generate a set of address range sizes based on the address range sizes indicated in the cache occupancy information and, for each given address range size of the set of address range sizes, to generate one or more cache indexes from the address invalidation range in dependence on the given address range size, each of the cache indexes identifying a corresponding entry set of the plurality of entry sets, and for each corresponding entry set to invalidate one or more entries of the corresponding entry set in dependence on whether the address range identified by those entries overlaps the address invalidation range.

The cache invalidation circuitry is configured to respond to the cache invalidation request in order to cause particular entries in the cache to be invalidated. The particular entries are identified by the invalidation request through the inclusion of an address invalidation range. The address invalidation range comprises information that enables identification of a first address, i.e., a starting address for the invalidation, and a size of the address invalidation range. Such range information may be provided as, for example, any two of a start address for the address range, an end address for the address range and the size of the invalidation range. Based on this information, the cache invalidation circuitry is configured to trigger invalidation of any entries in the cache that identify an address range that overlaps the address invalidation range.

The address invalidation range may correspond to a minimum addressable unit that the cache is configured to store, i.e., it may have a starting address that is aligned to an alignment boundary and a size that is equal to the minimum addressable unit. Alternatively, the address invalidation range may correspond to a plurality of the minimum addressable units. As a result, the cache invalidation request may result in the invalidation of a single cache entry or the invalidation of a plurality of cache entries. As a simple example, if the minimum addressable unit in the cache is a 4 KB block, and the address invalidation range covers a range of 2 MB, then the cache invalidation circuitry may be required to check to see whether each of 512 (or 513 in a case where the address invalidation range is not aligned to a 4 KB block boundary) addresses each having a size of the minimum addressable unit are present in the cache in order to ensure that all entries falling within the address invalidation range are invalidated.

In addition, the cache is arranged to store entries where the address range referred to in a given entry may be any one of a plurality or predetermined address range sizes. For example a first subset of entries of the cache may have a corresponding address range size that is equal to a first value (for example, 4 KB) and a second subset of entries of the cache may have a corresponding address range size that is equal to a second value (for example, 16 KB). For a given address invalidation range, the cache invalidation circuitry may be required to check for entries having a corresponding address range size equal to the first value, and entries having a corresponding address range size equal to the second value. Hence, returning to the example of a 2 MB invalidation range, the cache invalidation circuitry would have to check 512 addresses when considering address ranges having the first value and 128 addresses when considering address ranges having the second value, resulting in a potential 640 total addresses to check. It would be readily apparent to the person having ordinary skill in the art that the identified address range sizes are used purely for the purpose of providing an example and that other address range sizes could be provided.

There are two approaches that can be used by the cache invalidation circuitry to check the cache for entries for which it is necessary to trigger invalidation. In a first approach, the cache invalidation circuitry could perform a lookup in the cache for each possible entry associated with (overlapping) the address invalidation range. In a second approach, the cache invalidation circuitry could cycle through each entry of the cache and perform invalidation of any entries that are identified as overlapping the address invalidation range. In some cases, it may be beneficial to perform invalidation using the first approach and, in other cases, it may be beneficial to perform invalidation using the second approach. In particular, based on the address invalidation range, it may be more efficient to perform a lookup in every entry of the cache, rather than performing a lookup for each possible entry associated with the address invalidation range. The inventors have realised that the determination as to which approach to use can be improved using information obtained from the cache. The cache invalidation circuitry is therefore arranged to operate in one of two modes, an entry-driven invalidation mode in which the cache invalidation circuitry is configured to check each entry in the cache to determine which entry (or entries) overlap with the address invalidation range, and an invalidation-range-driven invalidation mode, in which the cache invalidation circuit is arrange to determine, based on cache occupancy information received from the cache that indicates which of the plurality of predetermined address range sizes are present in the cache, a set of all possible address ranges that could overlap with entries in the cache. For example, where the cache occupancy information indicates that a particular one of the predetermined address range sizes is not represented by any entries in the cache, the cache invalidation circuitry is arranged to exclude that address range size from the set of possible address ranges.

The cache invalidation circuitry can also use the cache occupancy information to determine which mode to operate in. As an example, the cache occupancy information may indicate that there are no entries of a minimal addressable size in the cache. Hence, when operating in the invalidation-range-driven mode, the cache invalidation circuitry need not perform any lookups based on that address range size. This restricts the total number of lookups that would be performed in the invalidation-range-driven invalidation mode. The cache invalidation circuitry can use the knowledge of the address invalidation range and the cache occupancy information in order to determine which of the modes is the more efficient mode for performing the invalidation and can trigger invalidation in that mode. As a result, the cache invalidation circuitry is therefore able to improve the efficiency with which cache entries that overlap the address invalidation range are invalidated.

The cache may take a variety of forms. In some example configurations, the cache may be arranged as a direct mapped cache. In other example configurations, the cache may be arranged as a set associative cache. In each case, the cache entries are grouped into a plurality of entry sets with each of the entry sets comprising one or more of the plurality of entries. When the cache is arranged as a direct mapped cache, each of the entry sets comprises a single entry. On the other hand, when the cache is arranged as a fully associative cache, or a set associative cache, each entry set contains plural entries. Each of the entry sets is identified by a cache index which is associated with a corresponding address range, such a cache index for example being generated based on a hash of at least a portion of the address associated with that corresponding address range. The cache invalidation circuitry may therefore be arranged to perform each lookup in the cache by generating a cache index from the address invalidation range and determining whether the entry set identified by the cache index contains any entries that overlap with the address invalidation range.

The set of address range sizes can comprise any of the address range sizes in the cache occupancy information. However, in some configurations, the set of address range sizes comprises each address range size indicated in the cache occupancy information. Alternatively, for some sizes, e.g., the larger address range sizes indicated in the cache occupancy information, for which there are fewer separate indexes to be generated (due to the larger range that is covered by each index at the larger address range size), the cache invalidation circuitry, when operating in the invalidation-range-driven invalidation mode, may always generate cache indexes associated with those larger address range sizes, thereby reducing the amount of cache occupancy information that needs to be passed between the cache and the cache invalidation circuitry.

Furthermore, in some configurations the cache invalidation request comprises invalidation entry size information identifying a subset of the plurality of predetermined address range sizes for which invalidation is to be triggered. In addition, the set of address range sizes may comprise each given address range size indicated in both of the cache occupancy information and the invalidation entry size information. For example, in some configurations, the invalidation request may indicate that, for the address invalidation range, the smallest address range size to be considered for invalidation is larger than the smallest address range size that is indicated by the plurality of predetermined address range sizes. As a result, the cache invalidation circuitry need not consider the address range sizes that are not included in the invalidation entry size information. The inclusion of the invalidation entry size information increases the likelihood that a more efficient invalidation procedure is performed.

Independent as to how the set of address range sizes is generated, in some configurations, the cache invalidation circuitry is configured, when operating in the invalidation-range-driven invalidation mode and when generating the one or more cache indexes, for each given address range size of the set of address range sizes: to generate a plurality of contiguous address ranges each having the given address range size, wherein the plurality of contiguous address ranges includes at least all addresses in the address invalidation range; and to generate as the one or more cache indexes generated in dependence on the given address range size, a cache index for each of the plurality of contiguous address ranges. In other words, the contiguous address ranges at each address range are sufficient to cover any cache entry corresponding to the given address range size for which the contiguous address ranges are generated. Hence, the generated cache indexes in the invalidation-range-driven invalidation mode comprehensively cover all possible cache entries that could potentially correspond to the address invalidation range. In some configurations, the indexes are generated by performing a hash of a subset of bits of each of the contiguous address ranges, where the subset of bits are sufficient to uniquely identify the address range for that one of the contiguous address ranges. The hash may be a lossy hash configured to compact the number of possible unique contiguous address ranges to a set of indexes equal to the number of entry sets in the cache.

In some configurations the invalidation mode selection circuitry is configured to perform the selection by: estimating a number of cache indexes required for operating using the invalidation-range-driven invalidation mode; and determining the invalidation mode based on a comparison between the number of cache indexes and a number of entry sets in the plurality of entry sets. The number of entry sets in the plurality of entry sets may be fixed. Alternatively, the plurality of entry sets may comprise only entry sets for which there is one or more valid entries. The cache invalidation circuitry can determine the number of entry sets for which there is one or more valid entries through feedback from the cache, for example, through the cache occupancy information. The number of cache indexes required for the invalidation-range-driven invalidation mode may vary dependent on the address invalidation range and the cache occupancy information. By selecting the mode based on a comparison of the number of entries, the cache invalidation circuitry can determine an invalidation mode that minimises the amount of individual invalidations that are required.

In some configurations the number of entry sets in the plurality of entry sets is equal to a total number of entry sets in the cache. The total number of entry sets in the cache may be referred to as the cache depth. In such configurations, the number of entry sets in the plurality of entry sets can be hard-wired into the cache invalidation circuitry or stored in a register accessible to the cache invalidation circuitry.

In some configurations the invalidation mode selection circuitry is responsive to the number of cache indexes and the number of entry sets meeting a predetermined condition, to select the entry-driven invalidation mode. Furthermore, the invalidation mode selection circuitry is responsive to the number of cache indexes and the number of entry sets not meeting the predetermined condition, to select the invalidation-range-driven invalidation mode. In alternative configurations, the invalidation mode selection circuitry is responsive to the number of cache indexes and the number of entry sets not meeting a predetermined condition, to select the entry driven invalidation mode, and is responsive to the number of cache indexes and the number of entry sets meeting the predetermined condition, to select the invalidation-range-driven invalidation mode.

The predetermined condition can be dependent on a number of different factors. However, in some configurations the predetermined condition is met when a performance metric calculated assuming operation in the entry-driven invalidation mode for the number of entry sets exceeds the performance metric calculated assuming operation in the invalidation-range-driven invalidation mode for the number of cache indexes. The amount of resources required per entry (or per entry set) to perform entry-driven invalidation may not be equal to the invalidation-range-driven invalidation mode. For example, the generation of the index in the invalidation range driven invalidation mode may comprise performing a hash of a portion of an address which may consume additional resources compared to operation in the entry-driven invalidation mode. Hence, in some cases, it may be beneficial to perform invalidation in a mode in which a greater number of entry sets are checked if the process of checking those entry sets is more efficient than when operating in the other mode.

In some configurations the performance metric is indicative of performance of the apparatus when performing invalidation required by the cache invalidation request and comprises at least one of: a power usage when performing the invalidation; a number of clock cycles used to perform the invalidation; and a total processing time used to perform the invalidation. Hence, dependent on the particular performance metric that is required, the operation of the cache invalidation circuitry can be tailored to improve performance with relation to that performance metric.

Alternatively, in some configurations the cache invalidation circuitry is configured to determine that the predetermined condition is met when the number of cache indexes exceeds the number of entry sets. In other words, rather than considering a performance related metric associated with each type of invalidation, the mode can be selected based on a determination as to which mode will result in the fewest individual lookups into the cache. This approach removes the need to estimate performance metrics associated with each of the modes, whilst ensuring that the invalidation circuitry is performing the fewest lookups. Furthermore, in some configurations the cache invalidation circuitry is configured to determine that the predetermined condition is met when the number of cache indexes exceeds or is equal to the number of entry sets.

In some configurations the cache invalidation circuitry is configured, when estimating the number of cache indexes: for each given address range size indicated in the set of address range sizes, to determine a corresponding number of contiguous address ranges of the given address range size required to include all addresses in the address invalidation range; and to estimate the number of cache indexes as a sum of the corresponding number of contiguous address ranges for each given address range size. This approach provides a means for estimating the number of contiguous address ranges without requiring the cache invalidation circuitry to perform additional operations in order to estimate the number of indexes. In some configurations, the cache invalidation circuitry may make use of additional information to discard duplicate lookups (different ones of the contiguous address ranges that result in a same index), thereby providing an improved estimate of the number of lookups to be performed in the invalidation-range-driven mode.

In some configurations the apparatus comprises one or more look up tables arranged to store, for a given address invalidation range, information identifying the corresponding number of contiguous address ranges for each of the plurality of predetermined address range sizes: and the cache invalidation circuitry is configured to determine the corresponding number of contiguous address ranges by performing a lookup in at least one of the one or more look up tables and excluding the corresponding number of contiguous address ranges for each of the plurality of predetermined address range sizes that is not included in the set of address range sizes. In some configurations, the one or more lookup tables comprise a distinct lookup table for each of the plurality of predetermined sizes. Alternatively, in some configurations, a single lookup table can be provided comprising information indicative of a number of lookups for each predetermined size. In some configurations, the information identifying the corresponding number of contiguous address ranges is presented as a one hot constant number (a binary number in which a single bit—the one hot bit—is set with each other bit cleared) whereby the single set bit in the one hot constant number provides an estimate to the nearest power of two of the number of contiguous address ranges. In some alternative configurations, a one cold constant number (a binary number in which a single bit—the one cold bit—is cleared with each other bit set) is used in place of the one hot constant number.

Due to the need to support a large range of addresses whilst maintaining a compact cache, there is a many to one mapping between the possible address ranges and the number of entry sets in the cache. Hence, an index generated for a corresponding address range having a given address range size may, by coincidence, correspond to an entry in which there is a different address with a different address range size that overlaps with the address invalidation range. When operating in the invalidation-range-driven invalidation mode, the manner in which such collisions are dealt with can be variously defined. In some configurations the cache invalidation circuitry is configured, when operating in the invalidation-range-driven invalidation mode, for each given address range size indicated in the set of address range sizes and for each corresponding entry set, to invalidate any entry whose identified address range overlaps the address invalidation range. Hence, whether the overlapping entry corresponds to the address for which the lookup was performed or to a different address that happens to fall within the invalidation range, the entry is invalidated.

In some configurations the cache invalidation circuitry is configured, when operating in the invalidation-range-driven invalidation mode and for each corresponding entry set, to invalidate only entries whose corresponding address range size matches the given address range size. Hence, if the generated index coincidentally corresponded to an entry of a different size that overlapped the invalidation range, then that entry would not be invalidated as a result of that generated index. For configurations in which the cache invalidation request comprises invalidation entry size information, the cache invalidation circuitry is prevented from invalidating entries which are excluded by virtue of not being identified in the invalidation entry size information. In some alternative configurations, an entry in the cache is only invalidated if it is in one to one correspondence with the address on which the invalidation is based. Whilst the cache can be an instruction cache or a data cache, in some configurations the cache is a memory management unit cache. The data items stored within the cache can take a variety of forms. In one example implementation, each entry provides access control information used to constrain access to the address range identified by that entry.

By way of specific example, the apparatus may further comprise address translation circuitry used to translate a target virtual address specified by a memory access request into a target physical address associated with a selected physical address space selected from among a plurality of physical address spaces. In such an implementation, a given entry stored in the cache storage may comprise granule protection information indicating, for at least one granule of physical addresses, which of the plurality of physical address spaces is allowed access to the at least one granule of physical addresses.

In one example implementation, each data item stored in the cache may provide such granule protection information, but in another example implementation the cache may additionally be able to store other information as data items. For instance, the granule protection information may be obtained by performing a multi-level table walk in memory, with the final level table providing the granule protection information, but with a non-final level table providing a pointer to a next level table. In such cases, it is possible that one or more of the entries may store a pointer to a next level table in memory. Such cached information may improve the speed with which the above multi-level table walk can be performed, by using the cached information to avoid one or more levels of the table walk.

In some configurations the address invalidation range indicates a range of virtual addresses and each entry of the cache comprises translation information indicating a translation between a block of virtual addresses and a corresponding block of physical addresses. Such address translation caches may comprise one or more translation lookaside buffers (TLBs) arranged to perform translation from the virtual address and a block of physical addresses. Whilst it may be the case that all of the data items within the cache comprise such address translation information, in other implementations one or more of the entries may store partial address translation information, which may for example include pointers to intermediate tables accessed when performing a page table walk to determine how to translate a virtual address into a corresponding physical address.

Whilst the techniques described herein may directly be incorporated in an apparatus, and/or be used to control one or more processes performed by such an apparatus, the concepts described herein may additionally, or alternatively, be embodied in computer-readable code for fabrication of an apparatus that embodies the described concepts. For example, the computer-readable code can be used at one or more stages of a design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates an apparatus 100 comprising a cache 104 and cache invalidation circuitry 102. The cache 104 comprises a plurality of entry sets 106 which each comprise one or more entries. Each of the entries stored in the cache 104 identifies an address range having an address range size that is one of a predetermined plurality of address range sizes. The cache 104 is arranged to provide cache occupancy information to the cache invalidation circuitry 102 that is indicative of which of the plurality of predetermined address range sizes are present in the cache 104. The cache invalidation circuitry 102 is responsive to receipt of a cache invalidation request identifying an address invalidation range, to trigger invalidation of entries in the cache that overlap with the address invalidation range. The cache invalidation circuitry 102 is operable in one of a plurality of modes including an entry driven invalidation mode and an invalidation-range-driven invalidation mode. In the entry driven invalidation mode, the cache invalidation circuitry is configured to perform a lookup for each entry set 106 in the cache 104, for example by sequentially generating indices for each of the entry sets 106. The cache 104 is arranged to perform a comparison to determine whether any entries in the entry sets 106 overlap with the address invalidation range and, if so, to invalidate those entries. In the invalidation range driven invalidation mode, the cache invalidation circuitry 102 is configured to generate a set of address range sizes based on the address range sizes indicated in the cache occupancy information and, for each given address range size of the set of address range sizes to generate one or more cache indexes from the address invalidation range in dependence on the given address range size. Each of the cache indexes generated for each of the set of address range sizes is used by the cache invalidation circuitry 102 to trigger the cache 104 to perform a lookup in an entry set 106 corresponding to that index and to invalidate any entries of that entry set that overlap with the address invalidation range. The cache invalidation circuitry 102 is also arranged to select between the entry-driven invalidation mode and the invalidation-range-driven invalidation mode based on the cache occupancy information and the address invalidation range.

Figure 2:
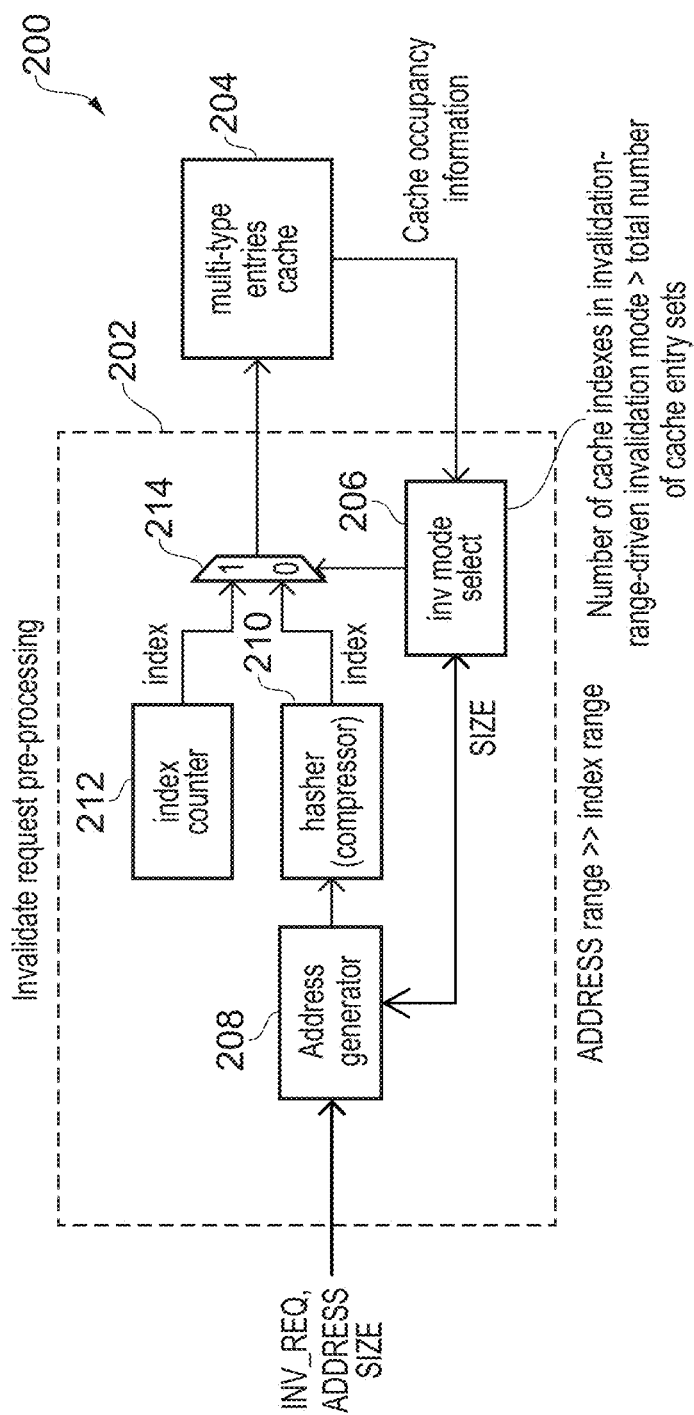
FIG. 2 schematically illustrates an apparatus according to various configurations of the present techniques.
Figure 2:
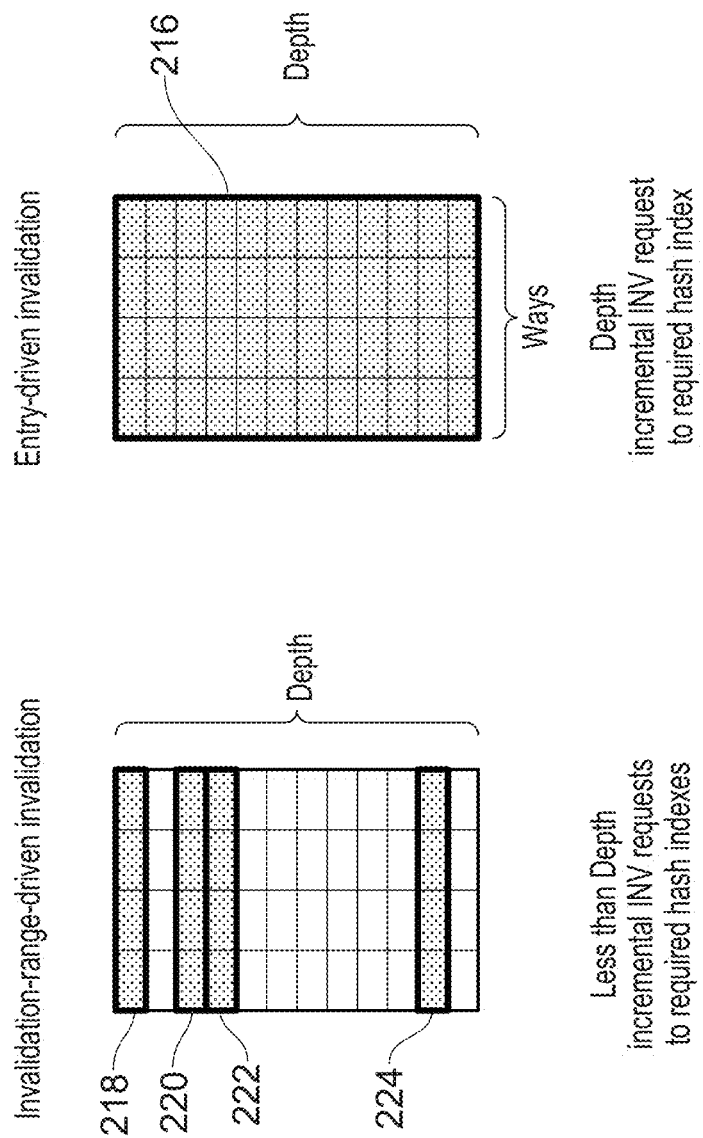

FIG. 2 schematically illustrates further details of the entry-driven invalidation mode and the invalidation-range-driven invalidation mode according to various configurations of the present techniques. The apparatus 200 comprises a cache 204 and cache invalidation circuitry 202. The cache invalidation circuitry 202 comprises an index counter 212 configured to, when operating in the entry-driven invalidation mode, sequentially work through each index associated with the cache 204. The cache invalidation circuitry 202 also comprises an address generator 208, hash circuitry 210, and invalidation mode selection circuitry 206. The address generator 208 is arranged to receive an invalidation request specifying an address range, for example, by specifying an initial address and a size of the address range. The invalidation request also (optionally) specifies invalidation entry size information identifying a subset of the plurality of predetermined address range sizes for which invalidation is to be triggered. The address generator 208 is arranged to pass at least the size information of the invalidation request to the invalidation mode selection circuitry 206.

The invalidation mode selector circuitry 206 is configured to determine a set of address range sizes that includes address range sizes that are indicated by the cache occupancy information as being present in the cache 204 and that (when the invalidation entry size information is specified) are indicated by the invalidation entry size information. The invalidation mode selector circuitry 206 is also arranged, for each of the set of address range sizes, to calculate the number of addresses (corresponding to the number of cache indexes) that are required to be generated by the address generator 208 in order to cover the address invalidation range indicated in the invalidation request. The invalidation mode selector circuitry 206 is provided with information indicating the cache depth (i.e., the number of entry sets in the cache) and is arranged to determine whether the number of addresses exceeds the cache depth and, when this is the case, to select the entry-driven invalidation mode. On the other hand, when the number of addresses does not exceed the cache depth, the invalidation mode selector circuitry 206 is arranged to select the invalidation-range-driven invalidation mode.

When the invalidation mode selection circuitry 206 determines that invalidation is to be performed in the entry-driven invalidation mode, the invalidation mode selection circuitry 206 controls the index counter 212 to sequentially generate indexes which are passed to the selection circuitry 214. The invalidation mode selection circuitry 206 is also arranged to control the selection circuitry 214 to use indexes generated by the index counter 212 for indexing into the cache 204 in order to sequentially work through each entry set of the cache to determine whether any entry in one or more of the entry sets overlaps with the address invalidation range and, if so, to trigger invalidation of those entries. The generated indexes cover each entry set 216 of the cache (as illustrated in the bottom right of FIG. 2).

When the invalidation mode selection circuitry 206 determines that invalidation is to be performed in the invalidation-range-driven mode, the invalidation mode selection circuitry 206 triggers the address generator 208 to generate the number of addresses (and, hence, the number of cache indexes) required for each address range size indicated in the set of address range sizes such that the addresses form a contiguous set of address ranges of that address range size that spans (fully covers) the address invalidation range specified in the invalidation request. The address generator 208 is arranged to pass the generated addresses to the hash circuitry 210 which is arranged to generate indexes corresponding to each generated address. The invalidation mode selection circuitry 206 is arranged to trigger the selection circuitry 214 to use the indexes generated by the hash circuitry 210. The generated indexes cover the range of addresses identified by the address invalidation range. Due to the presence of the hash circuitry 210, the generated indexes do not necessarily correspond to contiguous entry sets in the cache 204. Rather, purely be way of illustrative example, the generated indexes may correspond to entry sets 218, 220, 222, 224 distributed throughout the cache 204 (as illustrated in the bottom left of FIG. 2). The cache invalidation circuitry is arranged to perform a lookup using the index generated by the hash circuitry 210 and to determine whether or not any entries at the entry set corresponding to the generated index overlap with the address invalidation range and, if so, to trigger the invalidation of those entries.

In alternative configurations the invalidation mode selection circuitry 206 may be arranged to select between the entry-driven invalidation mode and the invalidation-range-driven invalidation mode based on a predetermined condition which, in some configurations, may be based on a performance metric. For example, the invalidation mode selection circuitry 206 may select the invalidation mode based on a power usage metric associated with the invalidation, or a total clock time associated with the invalidation. The selection circuitry 214 may be responsive to the predetermined condition being met (illustrated as logic 1) to select the entry-driven invalidation mode and to the condition not being met to select the invalidation-range-driven invalidation mode (illustrated as logic 0). In alternative configurations, the selection circuitry 214 may be responsive to the predetermined condition being not met (logic 0) to select the entry-driven invalidation mode and to the condition being met to select the invalidation-range-driven invalidation mode (logic 1). Furthermore, whilst the address generator 208 of FIG. 2 has been described as generating the addresses in response to the determination, by the invalidation mode selection circuitry 206, that the invalidation mode to be used is the invalidation-range-driven invalidation mode, in some alternative configurations (for example those where performance is considered more important than power consumption), the address generator 208 may generate the addresses in advance of or in parallel to the determination by the invalidation mode selection circuitry 206. In this way the addresses and the corresponding indexes generated would be prepared in advance of the selection resulting in an increase in performance.

Figure 3:
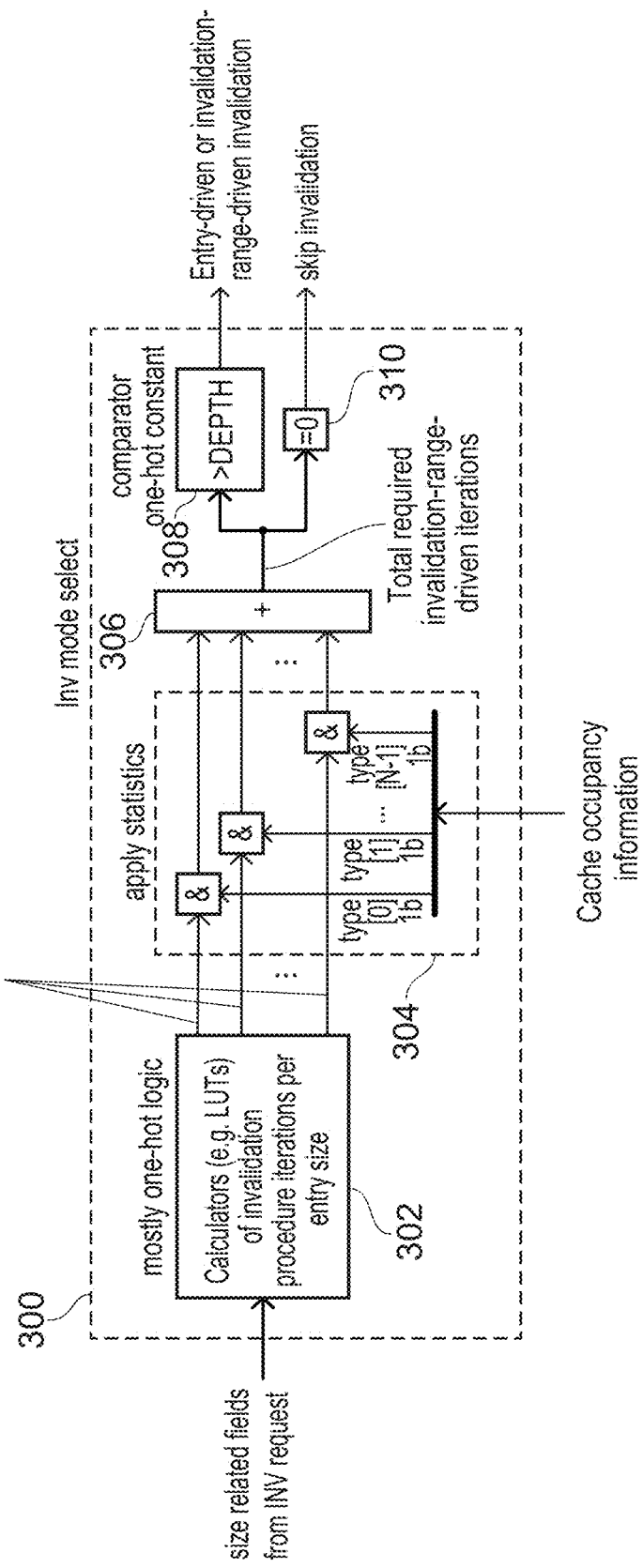
FIG. 3 schematically illustrates an apparatus according to various configurations of the present techniques.

FIG. 3 schematically illustrates further details of some configurations of invalidation mode selection circuitry 300 according to some example configurations. The invalidation mode selection circuitry 300 comprises a set of calculators 302 which optionally comprise one or more look up tables (LUTs), selection circuitry 304, summation circuitry 306 and comparator circuitries 308 and 310. The calculators 302 receive information identifying the size of the invalidation request. Such information may be an exact indication of the size of the invalidation range specified in the invalidation request or may be an approximation, for example, rounded to the nearest power of 2, of the address range size. Based on the received size information, the calculators 302 determine, for each address range size of the plurality of predetermined address range sizes, the number of contiguous address ranges of that address range size that are required to ensure that the generated address ranges for that address range size fully span the address invalidation range. The size information for each of the address range sizes is passed to the selection circuitry 304 which also receives cache occupancy information. In the illustrated example, the cache occupancy information is provided as an N-bit binary value corresponding to N predetermined address range sizes with each of the N-bits corresponding to a different one of the N predetermined address range sizes. The comparator circuitry 304 is arranged to filter the size information for each of the address range sizes so that when a corresponding bit of the cache occupancy information indicates that the address range size is present in the cache, then the size information relating to that address range size is allowed to pass to the summation circuitry 306. However, when the cache occupancy information indicates that the address range size is not present in the cache then the size information relating to that address range size is zeroed by the comparator circuitry 304. The summation circuitry 306 receives the filtered size information that has passed through the selection circuitry 304 and performs an addition operation to sum the received size information. The summed size information is then passed to the comparator circuitries 308, 310. The comparator circuitry 308 is arranged to determine whether the summed size information exceeds the cache depth (or, alternatively, whether the summed size information and the cache depth meet a predetermined condition) and, when the summed size information exceeds the cache depth, the entry-driven invalidation mode is selected. On the other hand, when the summed size information does not exceed the cache depth (i.e., is less than or equal to the cache depth), the invalidation-range-driven invalidation mode is selected. The comparator 310 is arranged to determine whether or not to skip invalidation altogether. One condition under which invalidation is skipped is when the summed size information is equal to zero. This can happen if either the cache is empty (i.e., there are no valid entries present in the cache so that the cache occupancy information indicates that there are no entries of any size present), or if the invalidation request contains invalidation entry size information identifying a subset of the plurality of predetermined address range sizes for which invalidation is to be triggered and the subset of the plurality of predetermined address range sizes has zero overlap with the address range sizes indicated in the cache occupancy information.

Figure 4:
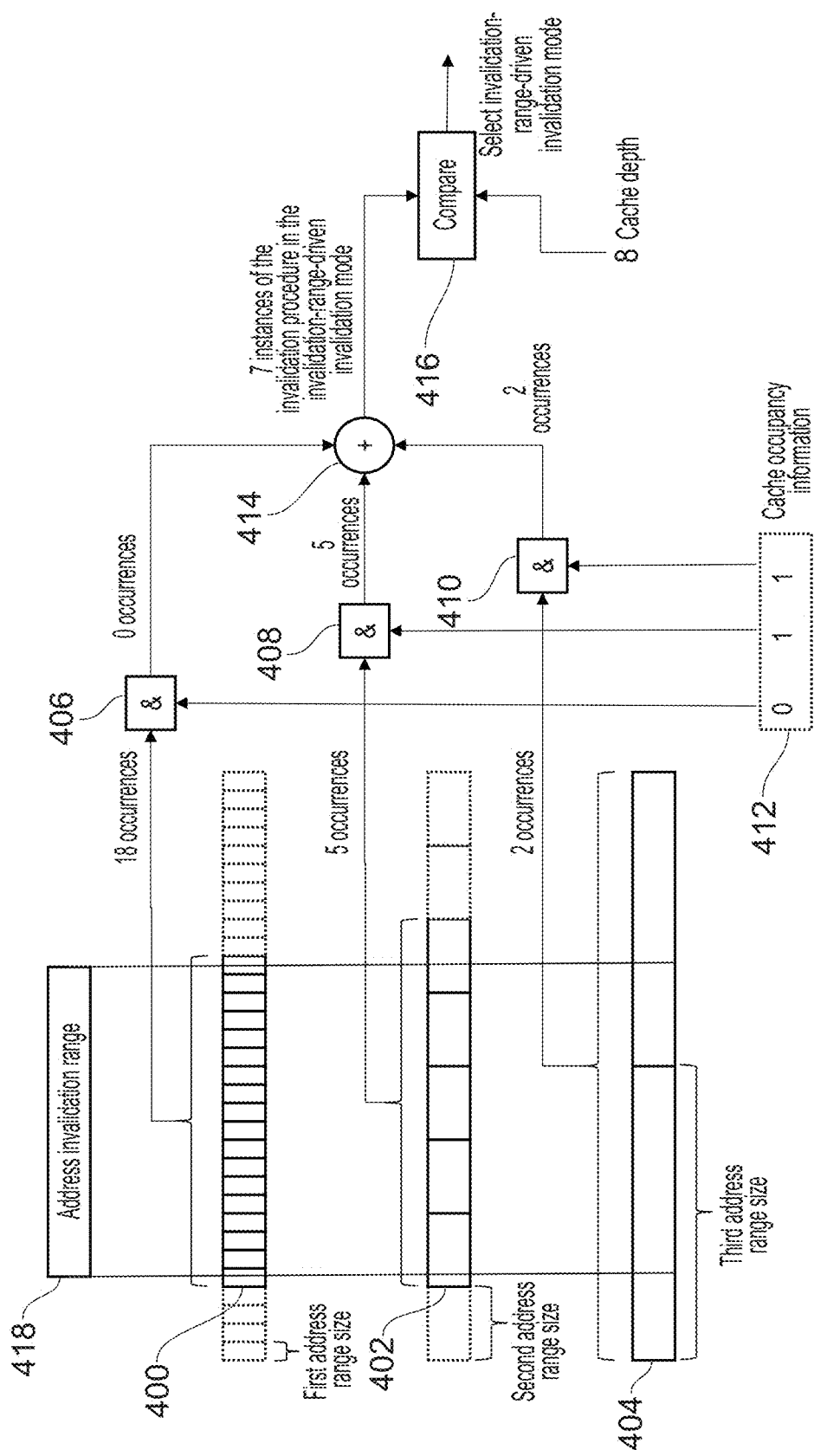
FIG. 4 schematically illustrates the selection of an invalidation mode according to various configurations of the present techniques.

FIG. 4 illustrates a first example of invalidation mode selection according to various configurations of the present techniques. In the illustrated example, the predetermined address range sizes comprise three different address range sizes including a first address range size, a second address range size, and a third address range size. The invalidation mode selection circuitry receives information indicating the address invalidation range 418 and determines, based on the address invalidation range 418, a first number of addresses 400 of the first address range size that are required to span the address invalidation range 418. The invalidation mode selection circuitry also determines, based on the address invalidation range 418, a second number of addresses 402 of the second address range size that are required to span the address invalidation range 418. The invalidation mode selection circuitry also determines, based on the address invalidation range 418, a third number of addresses 404 of the third address range size that are required to span the address invalidation range 418. In the illustrated configuration, the first number of addresses 400 is 18, the second number of addresses 402 is 5, and the third number of addresses 404 is 2. Each of the first number of addresses 400, the second number of addresses 402 and the third number of addresses 404 are passed, respectively, to a first filtering circuit 406, a second filtering circuit 408, and a third filtering circuit 410. The invalidation mode selection circuitry also receives cache occupancy information 412 indicating which address range sizes of the predetermined address range sizes are present in the cache. In the illustrated configuration, the cache occupancy information is [011] indicating that there are no occurrences of the first address range size in the cache, and that there are occurrences of the second address range size and the third address range size in the cache. The cache occupancy information is passed to the first filtering circuit 406, the second filtering circuit 408, and the third filtering circuit 410 in order to filter, respectively, the first number of addresses, the second number of addresses, and the third number of addresses. In particular, the first filter circuit 406 (which may be implemented, for example, using one or more AND gates to enable the first number of addresses to pass when the corresponding bit of the cache occupancy information is set to a one and to stop the first number of address from passing when the corresponding bit of the cache occupancy information is set to a zero) receives the most significant bit of the cache occupancy information 412. Because the most significant bit of the cache occupancy information 412 is a zero, the first number of addresses is filtered and is not passed to the summation circuitry 414. The second filter circuit 408 receives the second most significant bit of the cache occupancy information 412. Because the second most significant bit of the cache occupancy information 412 is a one, the second number of addresses 402 is able to pass to the summation circuit 414. The third filter circuit 410 receives the third most significant bit of the cache occupancy information 412. Because the third most significant bit of the cache occupancy information 412 is a one, the third number of addresses 404 is able to pass to the summation circuit 414. The summation circuit 414 receives the filtered numbers of addresses from the first filter circuit 406, the second filter circuit 408 and the third filter circuit 410. In the illustrated example, the summation circuit receives 0 from the first filter circuit 406, 5 from the second filter circuit 408, and 2 from the third filter circuit 410. The summation circuit sums the received numbers of addresses and outputs the summed number of addresses to the comparison circuitry 416. The comparison circuitry 416 compares the received summed number of addresses and the cache depth (which may in one example implementation be hardwired into the comparator circuit 416). In the illustrated configuration, the summed number of addresses is 7 which is less than the cache depth of 8. As a result, the comparator determines that the invalidation-range-driven invalidation mode is selected. In some alternative configurations, the cache depth may be provided as part of the cache occupancy information 412, or may be stored in a register, rather than being hardwired into the comparator circuit 416.

Figure 5:
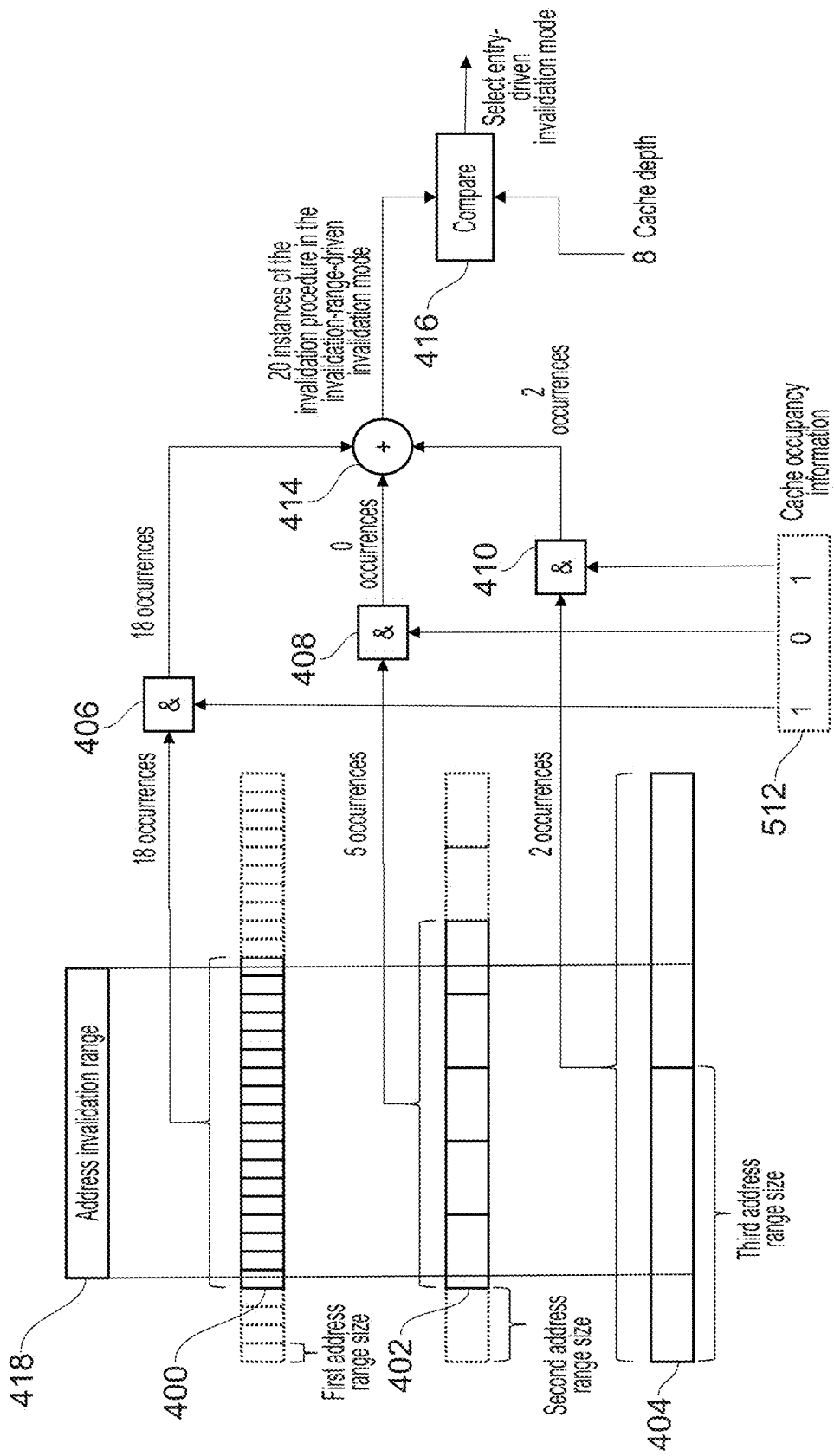
FIG. 5 schematically illustrates the selection of an invalidation mode according to various configurations of the present techniques.

FIG. 5 schematically illustrates a second example of invalidation mode selection according to various configurations of the present techniques. In the illustrated example, the address invalidation range 418 and the circuitry used is the same as described in relation to FIG. 4 and, for conciseness, the description will not be repeated. FIG. 5 differs from FIG. 4 in that the cache occupancy information 512 is [101] indicating that the cache contains occurrences of the first address range size and the third address range size, but that there are no occurrences of the second address range size in the cache. As a result, the first comparator 406 allows the first number of occurrences 400 to pass, the second comparator 408 stops the second number of occurrences 402 from passing and the third comparator 410 allows the third number of occurrences 404 to pass. The summation circuitry 414 receives an indication of 18 occurrences from the first filter circuit 406, an indication of 0 occurrences from the second filter circuit 408 and an indication of 2 occurrences from the third filter circuit 410. The summation circuit sums the received numbers of addresses and outputs the summed number of addresses to the comparison circuitry 416. The comparison circuitry 416 compares the received summed number of addresses and the cache depth (which in one example is, as mentioned earlier, hardwired into the comparator circuit 416). In the illustrated configuration, the summed number of addresses is 20 which is more than the cache depth of 8. As a result, the comparator determines that the entry-driven invalidation mode is selected.

Figure 6:
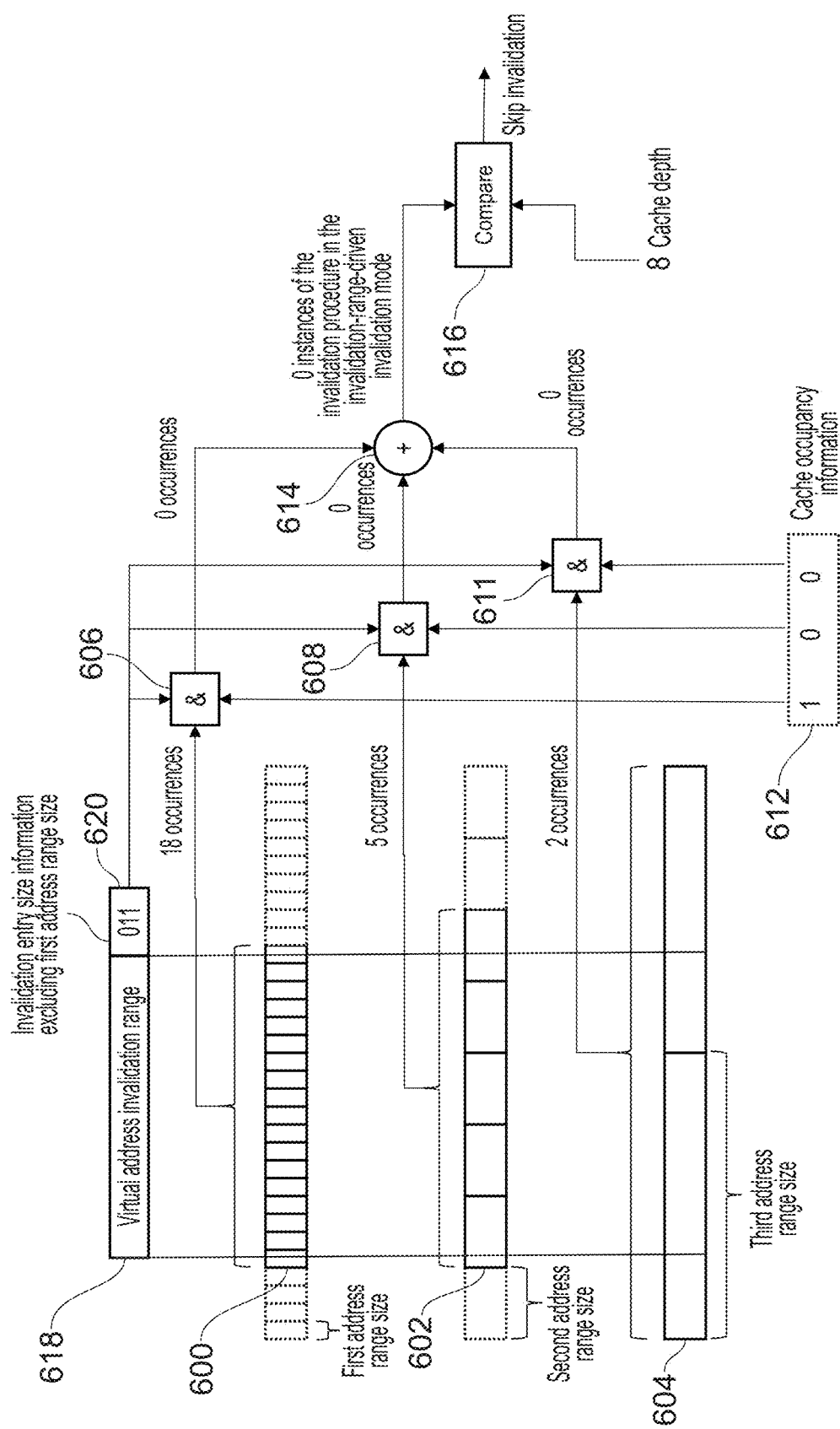
FIG. 6 schematically illustrates the selection of an invalidation mode according to various configurations of the present techniques.

FIG. 6 schematically illustrates a third example of invalidation mode selection according to various configurations of the present techniques. The illustrated example differs from the examples presented in FIGS. 4 and 5 in that the address invalidation range is a virtual address invalidation range 618 which includes invalidation entry size information 620. The invalidation entry size information 620 is [011] indicating that the invalidation procedure is arranged to only consider invalidation of entries that are of the second address range size or of the third address range size. As is the case for FIGS. 4 and 5, the address invalidation range 618 comprises a first number of addresses 600 having a first address range size, a second number of address 602 having a second address range size and a third number of addresses 604 having a third address range size. In the illustrated example, the first number of addresses 600 is 18, the second number of addresses 602 is 5 and the third number of addresses 604 is 2. The first number of addresses 600 is passed to a first comparator 606 which also receives the most significant bit of the cache occupancy information 612 and the most significant bit of the invalidation entry size information. The first comparator 606 is arranged to allow the first number of occurrences 600 to pass when both of the most significant bit of the cache occupancy information 612 and the most significant bit of the invalidation entry size information 620 are set to one. In the illustrated configuration, this is not the case because the most significant bit of the invalidation entry size information 620 is set to zero. As a result, the first number of addresses 600 is prevented from being passed to the summation circuitry 614 which instead receives an indication that zero entries having the first address range size are to be invalidated. The second comparator 608 is arranged to allow the second number of occurrences 602 to pass when both of the second most significant bit of the cache occupancy information 612 and the second most significant bit of the invalidation entry size information 620 are set to one. In the illustrated configuration, this is not the case because the second most significant bit of the cache occupancy information 612 is set to zero. As a result, the second number of addresses 602 is prevented from being passed to the summation circuitry 614 which instead receives an indication that zero entries having the second address range size are to be invalidated. The third comparator 611 is arranged to allow the third number of occurrences 604 to pass when both of the third most significant bit of the cache occupancy information 612 and the third most significant bit of the invalidation entry size information 620 are set to one. In the illustrated configuration, this is not the case because the third most significant bit of the cache occupancy information 612 is set to zero. As a result, the third number of addresses 604 is prevented from being passed to the summation circuitry 614 which instead receives an indication that zero entries having the third address range size are to be invalidated. The summation circuitry 614 receives an indication of 0 occurrences from the first filter circuit 606, an indication of 0 occurrences from the second filter circuit 608 and an indication of 0 occurrences from the third filter circuit 611. The summation circuit sums the received numbers of addresses and outputs the summed number of addresses to the comparison circuitry 616. The comparison circuitry 616 compares the received summed number of addresses and the cache depth (which in one example is, as mentioned earlier, hardwired into the comparator circuit 616). In the illustrated configuration, the summed number of addresses is 0 which is less than the cache depth of 8. However, rather than initiate invalidation in the invalidation-range-driven invalidation mode, the comparator determines that the invalidation can be skipped because there are no entries in the cache that correspond to the entry sizes indicated in the invalidation entry size information.

In the example illustrated in FIG. 6, the cache invalidation circuitry passes the invalidation entry size information 620 directly to the first filter circuit 606, the second filter circuit 608, and the third filter circuit 611. However, in some alternative configurations, cache entries corresponding to a virtual address range may be associated with page tables comprising additional metadata, for example, a contiguous hint indicating that the address identified in that cache entry may be indicative of one or more contiguous address ranges. As a result, the address range sizes associated with a virtual address invalidation range 618 having invalidation entry size information 620 that excludes a particular size range may overlap with entries in the cache that correspond to contiguous entries. As a result, the cache invalidation circuitry may need to consider not only the invalidation entry size information 620 but also entries in the cache that identify an address range size corresponding to a contiguous plurality of the address range sizes identified in the invalidation entry size information 620. For example, invalidation entry size information identifying only 16 KB pages, may also require 2 MB address range sizes to be considered as candidates for invalidation because such entries may correspond to a contiguous plurality of 16 KB pages.

Figure 7:
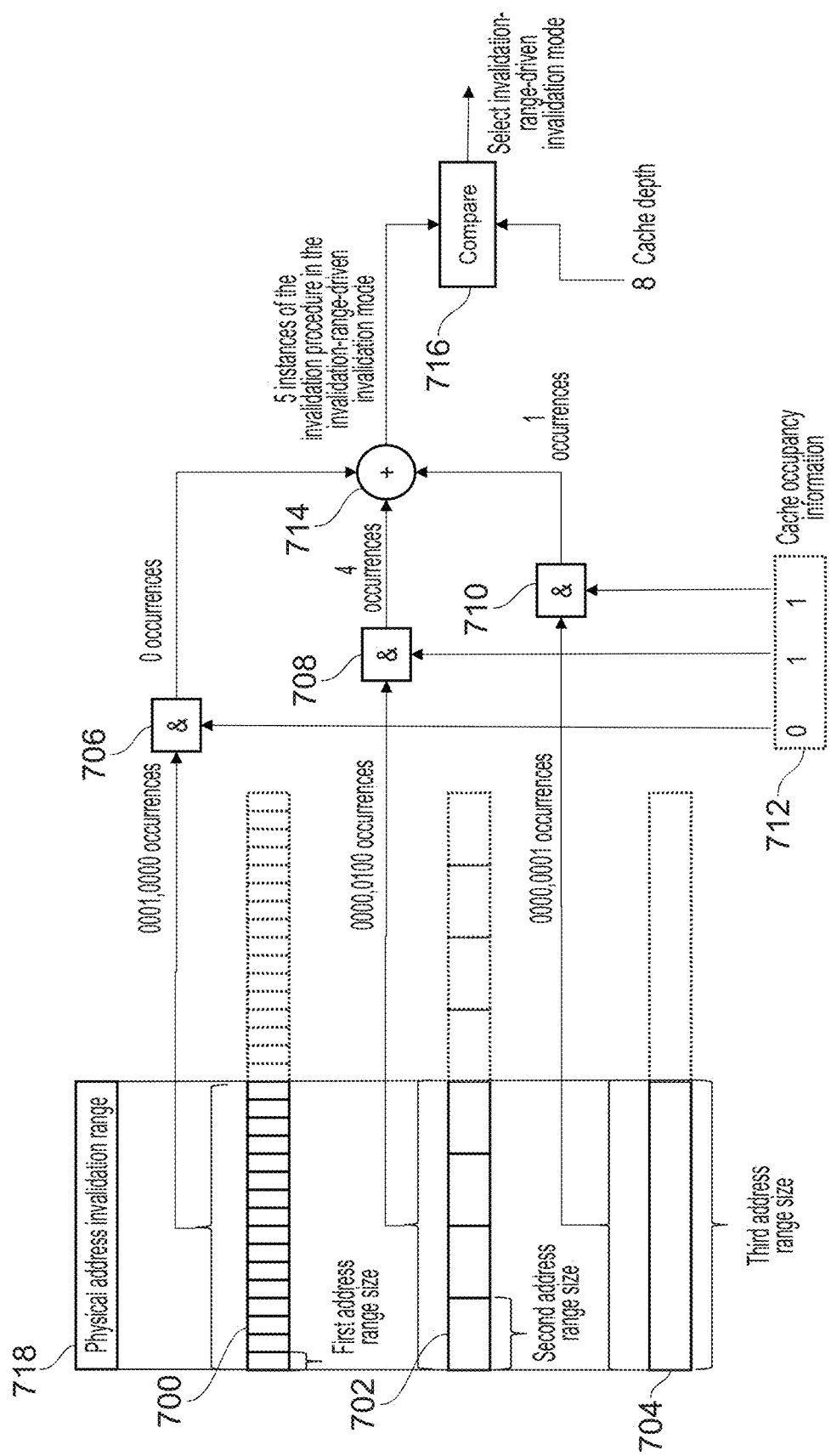
FIG. 7 schematically illustrates the selection of an invalidation mode according to various configurations of the present techniques.

FIG. 7 schematically illustrates a fourth example of invalidation mode selection according to various configurations of the present techniques. In the illustrated example, the address invalidation range 718 is a physical address invalidation range that is aligned with the address boundaries of addresses having the first address range size, the second address range size, and the third address range size. In particular, the address invalidation range 718 defines an address range equal to the third address range size and aligned to an address boundary associated therewith. Because the address invalidation range 718 is aligned to the address boundary of each address range size, the invalidation mode selection circuitry can determine the number of addresses of each size required to span the address invalidation range based only on the size of the address invalidation range. In particular, it can be determined that the size of the address invalidation range 718 matches the third address range size and, hence, the third number of addresses 704 having an address range size that is equal to the third address range size is 1. In the illustrated configuration, the first to third numbers of occurrences are represented using a one hot constant representation in which a single one of the bits is set to one. In particular, the first number of addresses is determined to be 0001,0000, the second number of addresses is determined to be 0000,0100, and the third number of address is determined to be 0000,0001. The first number of addresses 700 is passed to the first filter circuit 706 which also receives an indication of the most significant bit of the cache occupancy information 712. Because the most significant bit of the cache occupancy information 712 is 0, the first filter circuit 706 prevents the first number of addresses 700 from being passed to the summation circuit 714 which instead receives an indication that there are no occurrences of the first address range size. The second number of addresses 702 is passed to the second filter circuit 708 which also receives an indication of the second most significant bit of the cache occupancy information 712. Because the second most significant bit of the cache occupancy information 712 is 1, the second filter circuit 708 allows the second number of addresses 702 to be passed to the summation circuit 714. The third number of addresses 704 is passed to the third filter circuit 710 which also receives an indication of the third most significant bit of the cache occupancy information 712. Because the third most significant bit of the cache occupancy information 712 is 1, the third filter circuit 710 allows the third number of addresses 704 to be passed to the summation circuit 714. The summation circuit 714 sums the received numbers of addresses and outputs the summed number of addresses to the comparison circuitry 716. The comparison circuitry 716 compares the received summed number of addresses and the cache depth (which in one example is, as mentioned earlier, hardwired into the comparator circuit 716). In the illustrated configuration, the summed number of addresses is 5 which is less than the cache depth of 8. Hence, the comparison circuitry 716 selects the invalidation-range-driven invalidation mode.

In each of FIGS. 4-7 the cache occupancy information has been illustrated as comprising information relating to three different predetermined sizes. It would be readily apparent to the skilled person that this is chosen for illustrative purpose and any number of predetermined sizes could be defined and that the number of comparators provided in FIGS. 4-7 would be increased to match the number of predetermined sizes.

Figure 8:
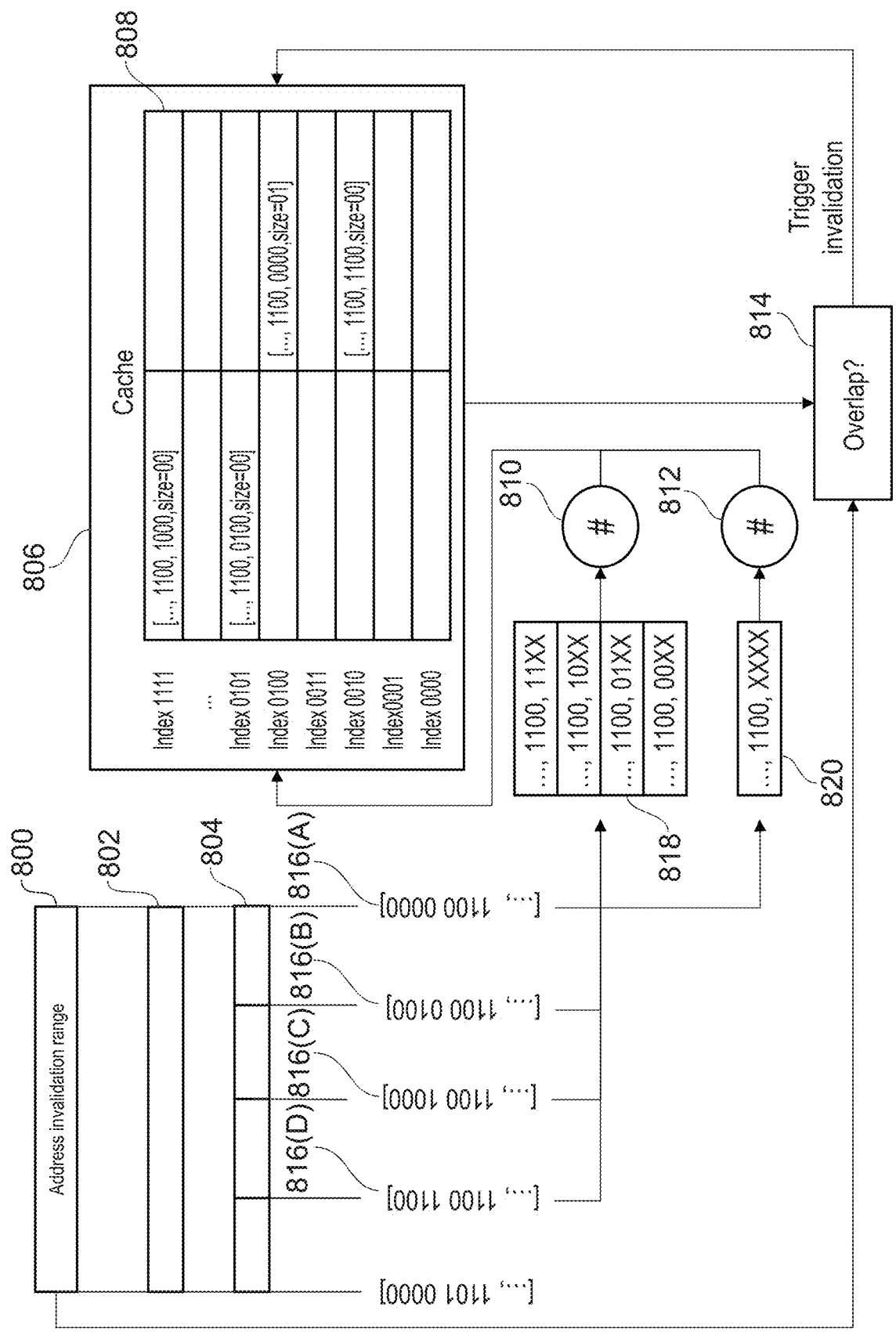
FIG. 8 schematically illustrates the invalidation of a cache entry according to various configurations of the present techniques.

FIG. 8 schematically illustrates the operation of the cache invalidation circuitry when operating in the invalidation-range-driven invalidation mode. The cache invalidation circuitry receives an invalidation request specifying an address invalidation range 800. It is assumed that, in the illustrated example, the cache invalidation circuitry is operating in the invalidation-range-driven mode. The cache invalidation circuitry generates a sequence of address ranges that cover the address invalidation range. The sequence of addresses comprises a first address range 804 comprising four different address ranges each having a first address range size that is/of the address invalidation range size. The sequence of addresses further comprises a second address range 802 comprising a single address range having a second address range size that is equal to the address invalidation range size. The single address in the second address range 802 begins at address 816(A). The first address range 804 comprises a range beginning at address 816(A), a range beginning at address 816(B), a range beginning at address 816(C) and a range beginning at address 816(D). Based on the defined address invalidation range 800 there are therefore five different addresses 818, 820 to be considered for index generation. The address 820 based on the second address range 802 is fed into hash circuitry 812 which performs a hash based on the portion of the address 820 that distinguishes that address range. In particular, the address 820 describes a range of address space that incorporates all possible combinations of the four least significant bits. Therefore, the hash generated from this range excludes the four least significant bits of the address 820. The addresses 818 based on the first address range 804 are fed into has circuitry 810 which performs a hash based on the portion of each address 818 that distinguishes that address range. In particular, each of the addresses 818 describe a range of address space that incorporates all possible combinations of the two least significant bits of the address. Therefore, the hash generated from this range excludes the two least significant bits of each of the addresses 818. In this way, each of the addresses is converted into an index which is fed into cache 806 as an invalidation request.

The cache 806 comprises a plurality of entry sets 808. In the illustrated example, each of the plurality of entry sets 808 comprises two entries. The entries comprise information identifying a starting address of the address range and size information indicative of a size of address range to which that entry corresponds. In the illustrated example, the information "size=00" indicates that the entry has the first address range size and the information "size=01" indicates that the entry has the second address range size. The cache 806 responds to the invalidation request by performing sequential lookups using the hash value generated by the hash circuitry 810 or the hash circuitry 812 as a cache index. Whilst, in the illustrated example, the hash circuitry 810 and the hash circuitry 812 are illustrated as distinct circuitry blocks, in some configurations, a single hash circuit could be provided with the addresses 818 and the addresses 820 being passed sequentially through the single hash circuit. If it is determined that any of the one or more entries in one of the entry sets identified by one of the indexes are valid, then that entry is passed (routed) to the overlap determination circuitry 814 which determines whether any of the one or more entries overlaps with the address invalidation range. If so, then the overlap determination circuitry 814 triggers the cache 806 to invalidate those one or more entries. For example, if the address 820, when passed through the hash circuitry 812 resulted in an index of 0100 then each valid entry of the cache entries corresponding to the entry set indexed with the index 0100 would be compared against the address invalidation range. In this case, the entry [ . . . , 1100,0000, size=01] is present in the cache 806 at the index 0100. This entry identifies the address [ . . . , 1100,0000] and indicates that the size of the entry is equal to the second address range size. This entry is passed to the overlap determination circuitry 814 where it is compared against the address invalidation range 800. In this case, the address invalidation range is determined to overlap with the cache entry at index 0100 and the overlap determination circuitry 814 is arranged to trigger the cache 806 to invalidate that entry.

Figure 9:
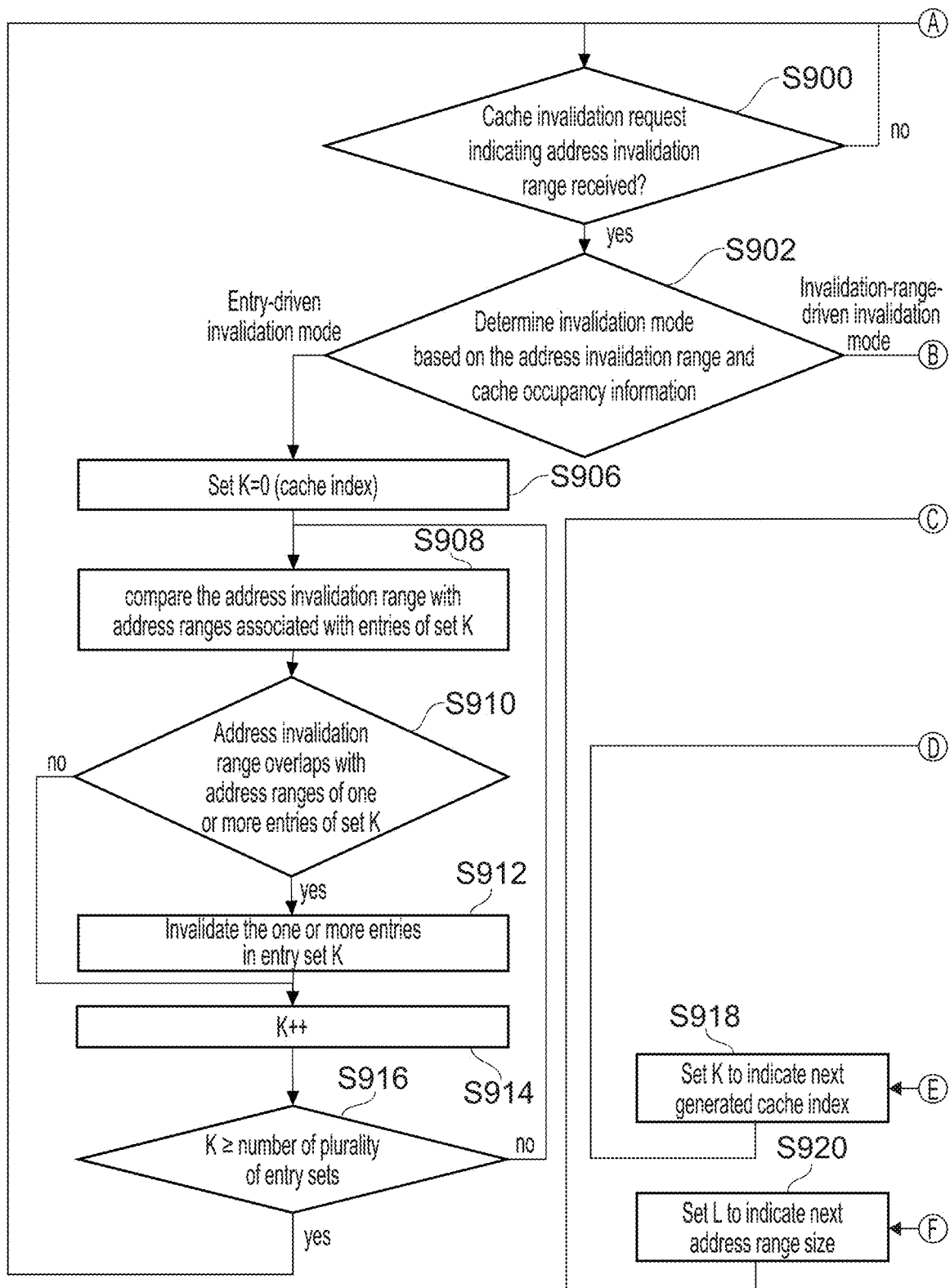
FIG. 9 schematically illustrates a sequence of steps carried out by an apparatus according to various configurations of the present techniques.
Figure 9:
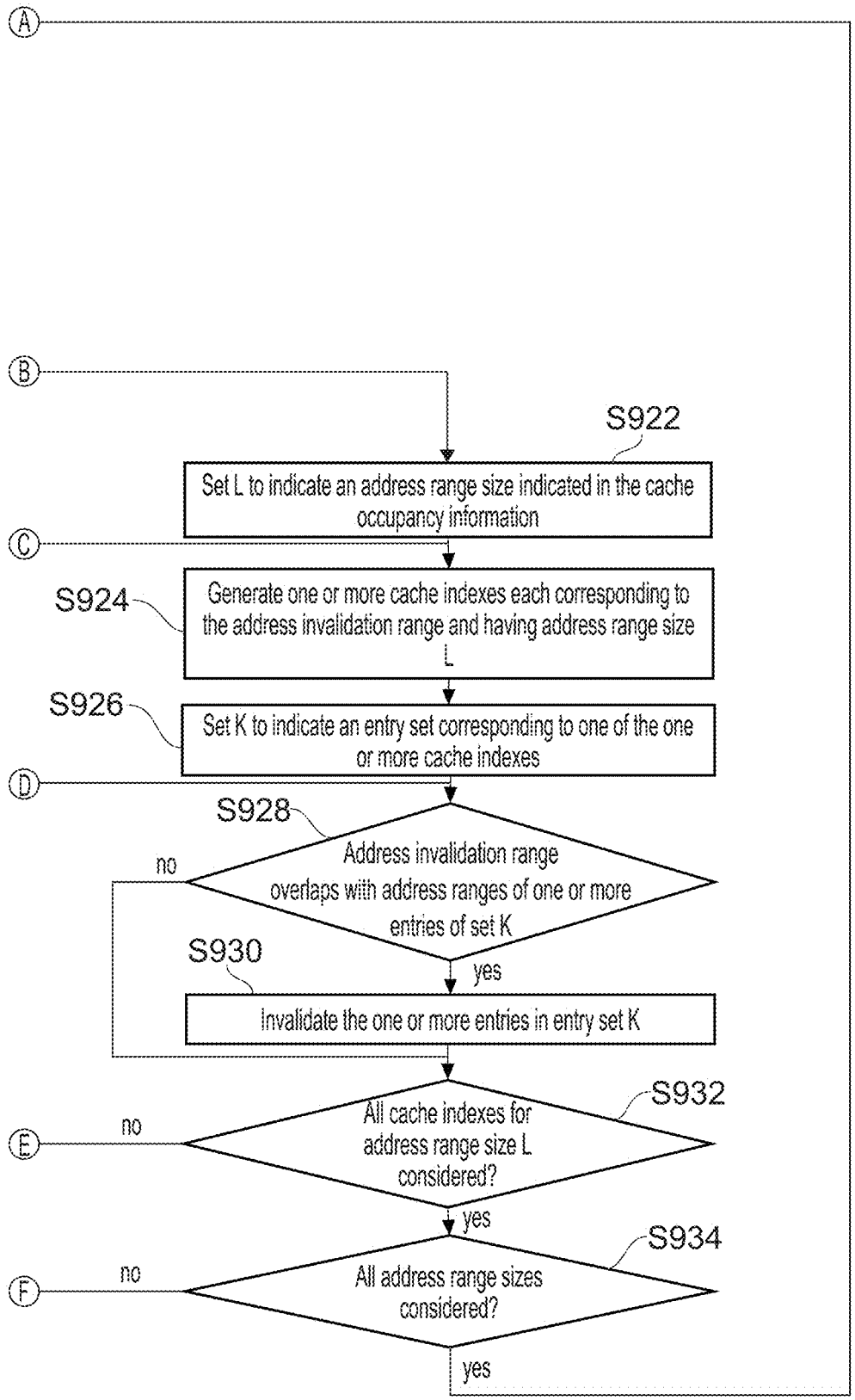

FIG. 9 schematically illustrates a sequence of steps that are carried out by the address invalidation circuitry in accordance with some configurations of the present techniques. Flow begins at step S900, where it is determined whether a cache invalidation request indicating an address invalidation range has been received. The address range may be identified by, for example, any two of a starting address, a final address, and an address range size. If, at step S900, it is determined that a cache invalidation request has not been received then flow remains at step S900. If, at step S900, it is determined that a cache invalidation request has been received then flow proceeds to step S902. At step S902, the cache invalidation circuitry determines whether to operate in the entry-driven invalidation mode or the invalidation-range-driven invalidation mode. Further details on the steps taken in selecting the invalidation mode will be set out in FIG. 10.

If, at step S902, the entry-driven invalidation mode is selected, then flow proceeds to step S906. At step S906, the cache invalidation circuitry begins the process of stepping through the entry sets by setting the index counter to indicate the first index (K=0) before flow proceeds to step S908. At step S908, the cache invalidation circuitry compares the address invalidation range with address ranges associated with the entries of entry set K before flow proceeds to step S910. At step S910, it is determined whether the address invalidation range overlaps with any of the address ranges of one or more entries of entry set K. If, at step S910, it was determined that there is no overlap between any of the entries in the entry set K, then flow proceeds to step S914. If, at step S910, it was determined that one or more of the entries of entry set K overlap with the address invalidation range, then flow proceeds to step S912 where the cache invalidation circuitry triggers invalidation of the one or more entries in entry set K that were identified as overlapping the address invalidation range. Flow then proceeds to step S914. At step S914, the next index is generated (K++) before flow proceeds to step S916. At step S916, it is determined whether every entry set of the plurality of entry sets has been considered. If, at step S916, it is determined that there are still entry sets to consider then flow returns to step S908. If, at step S916, it is determined that all the entry sets of the plurality of entry sets have been considered then flow returns to step S900.

If, at step S902, the invalidation-range-driven invalidation mode is selected, then flow proceeds to step S922. At step S922, the cache invalidation circuitry sets parameter L to indicate an address range size that is indicated in the cache occupancy information before flow proceeds to step S924. At step S924, the cache invalidation circuitry generates one or more cache indexes each of which correspond to the address invalidation range and have an address range size L. The indexes generated at step S924 are chosen, for address range size L to correspond to a set of contiguous address ranges that span the address invalidation range. Flow then proceeds to step S926. At step S926, the cache invalidation circuitry is arranged select an entry set corresponding to one of the cache indexes generated for the address range size L before flow proceeds to step S928. At step S928, the cache invalidation circuitry determines whether the address invalidation range overlaps with the address ranges of each entry in the entry set K. If, at step S928, it is determined that there are no entries in the entry set K that overlap with the address invalidation range, then flow proceeds to step S932. If, at step S928, it is determined that there are entries in entry set K that overlap with the address invalidation range, then flow proceeds to step S930 where those entries are invalidated before flow proceeds to step S932. At step S932, it is determined whether all the cache indexes for the address range size L have been considered. If, at step S932, it is determined that all the cache indexes for the address range size L have not been considered then flow proceeds to step S918. At step S918, the index is set to indicate a next generated cache index of the one or more cache indexes before flow returns to step S928. If, at step S932, it was determined that all the cache indexes for the address range size L have been considered then flow proceeds to step S934. At step S934, it is determined whether all the address range sizes have been considered. If at step S934, it is determined that all the address range sizes have not been considered then flow proceeds to step S920 where L is set to indicate the next address range size before flow returns to step S924. If, at step S934, it was determined that all the address range sizes have been considered then flow returns to step S900.

Figure 10:
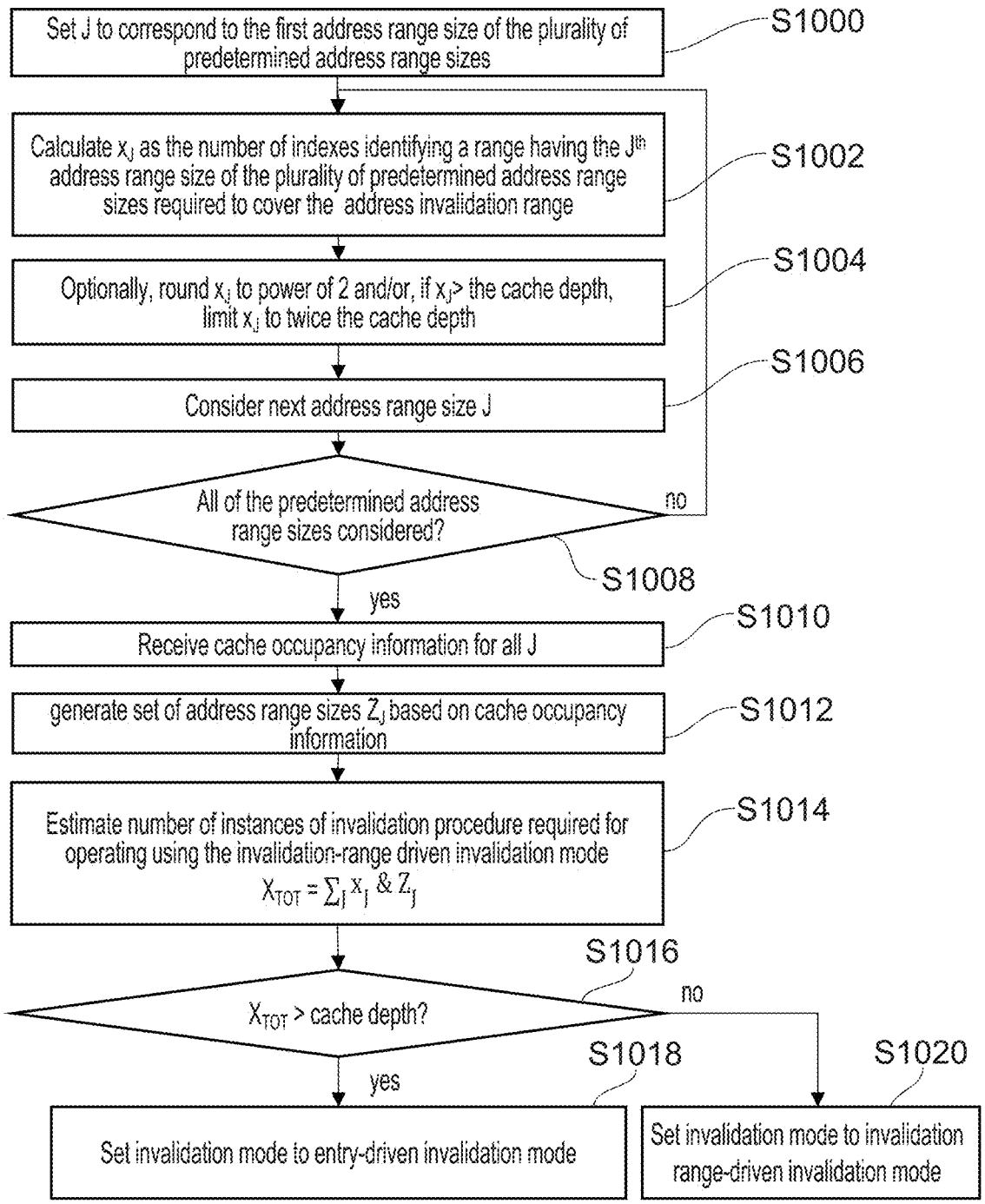
FIG. 10 schematically illustrates a sequence of steps carried out by an apparatus according to various configurations of the present techniques.

FIG. 10 schematically illustrates a sequence of steps that are carried out by the cache invalidation circuitry in order to determine which invalidation mode to operate in. Flow begins at step S1000 where J is set to correspond to a first address range size of the plurality of predetermined address range sizes. Flow then proceeds to step S1002 where a calculation is performed, for example using an arithmetic circuit or a lookup table, to identify $x_J$ as the number of indexes identifying an address range having the $J^{th}$ address range size that are required to cover the address invalidation range. For example, the calculation may comprise dividing the size of the address invalidation range by the $J^{th}$ address range size and rounding up to the nearest whole number. Flow then proceeds to step S1004, where $x_J$ is (optionally) rounded to a power of 2 or, (optionally) if $x_J$ is greater than the cache depth, then $x_J$ may be limited to a nearest reasonable value that is greater than the cache depth (for example, where one-hot constants are used to represent the number of addresses, this reasonable value can be twice the cache depth in order that it can be represented using the one-hot constant representation, alternatively, where $x_J$ is not rounded to a power of 2, then the reasonable value can be the cache depth +1). Flow then proceeds to step S1006 where J is incremented to consider the next address range size (J++). Flow then proceeds to step S1008 where it is determined if all of the predetermined sizes have been considered. If, at step S1008, it is determined that not all of the predetermined address range sizes have been considered then flow returns to step S1002. If, at step S1008, it is determined that all of the predetermined address range sizes have been considered then flow proceeds to step S1010. At step S110b, the cache invalidation circuitry receives (retrieves) the cache occupancy information for all address range sizes K before flow proceeds to step S1012. At step S1012, the cache invalidation circuitry generates a set of address range sizes $Z_J$ that are based on the cache occupancy information. In some configurations, the set of address range sizes is a binary indicator that identifies (for example with a value of 1) all address range sizes indicated in the cache occupancy information. In alternative configurations, the set of address range sizes comprises address range sizes indicated in the cache occupancy information that are not excluded by invalidation entry size information included in the cache invalidation request. Flow then proceeds to step S1014 where a number of instances of the invalidation procedure ($X_{TOT}$) are estimated as the sum of products of $x_J$ and $Z_J$. In other words the total estimated instances of the invalidation procedure is obtained by summing the calculated number of indexes required for each size range J that are indicated as being included in the set of address range sizes. Flow then proceeds to step S1016 where it is determined if the total estimated instances of the invalidation procedure is greater than the cache depth. If, at step S1016, it is determined that the total estimated instances of the invalidation procedure is greater than the cache depth then flow proceeds to step S1018 where the invalidation mode is set to be the entry-driven invalidation mode. If, at step S1016, it was determined that the total estimated instances of the invalidation procedure is less than or equal to the cache depth then flow proceeds to step S1020 where the invalidation mode is set to be the invalidation-range-driven invalidation mode.

It would be readily apparent to the person having ordinary skill in the art that the condition at S1016 is an example of a condition that is used to set the invalidation mode. In alternative configurations the condition could be replaced with $X_{TOT} \geq$ cache depth. In further alternative conditions, the condition could be based on an estimated performance condition for each mode, for example, a total estimated invalidation time, power consumption, or number of clock cycles. Furthermore, the person having ordinary skill in the art would understand that the sequential flow set out in FIGS. 9 and 10 is for exemplary purpose to illustrate the logical decisions that are made by the cache invalidation circuitry and that certain steps, for example, steps S1000-S1008 could be readily replaced through a parallel calculation of $x_J$ for all J.

Figure 11:
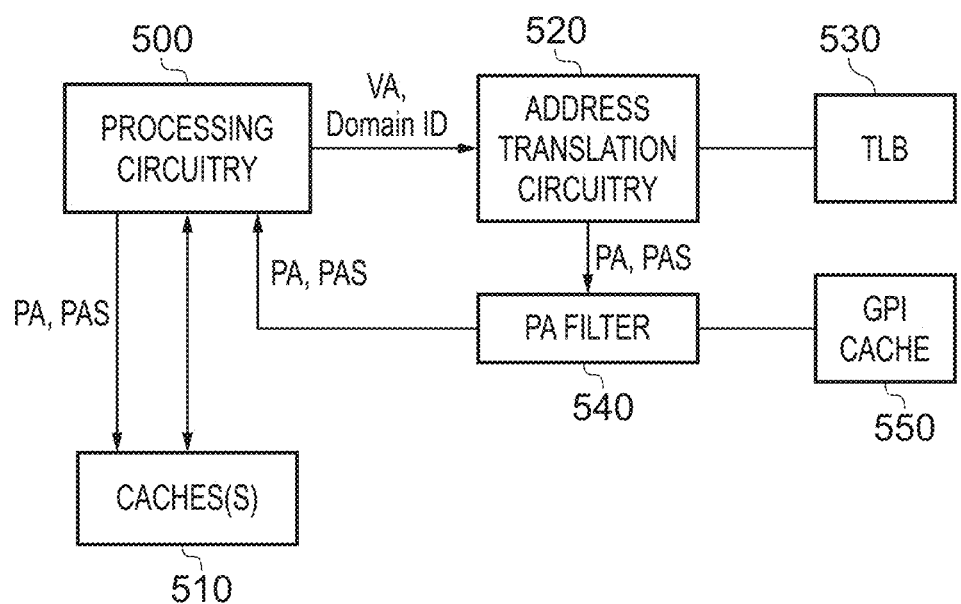
FIG. 11 schematically illustrates an apparatus according to various configurations of the present technique.

FIG. 11 is a block diagram illustrating an example system in which the techniques described herein may be utilised. Processing circuitry 500 is provided for performing data processing operations in response to instructions, with reference to data stored in registers (not shown). During performance of such data processing operations, memory accesses may need to be performed. The processing circuitry 500 may be capable of issuing memory access requests specifying a virtual address (VA) identifying the addressable location to be accessed and a domain identifier (Domain ID or 'security state') identifying the current domain (in one particular example implementation the domain can either be non-secure, secure, realm or root). Address translation circuitry 520 (e.g. a memory management unit (MMU)) translates the virtual address into a physical address (PA) through one of more stages of address translation based on page table data defined in page table structures stored in the memory system. A translation lookaside buffer (TLB) 530 acts as an address translation cache for caching some of that page table information for faster access than if the page table information had to be fetched from memory each time an address translation is required. In this example, as well as generating the physical address, the address translation circuitry 520 also identifies a physical address space (PAS) associated with the access request and outputs a physical address space (PAS) identifier identifying that physical address space.

A PAS filter 540 is used to check, based on the translated physical address and the PAS identifier, whether that physical address is allowed to be accessed within the specified physical address space identified by the PAS identifier. This check is based on granule protection information (GPI) stored in a granule protection table structure stored within the memory system. The granule protection information may be cached within a granule protection information cache 550, similar to a caching of page table data in the TLB 530. While the granule protection information cache 550 is shown as a separate structure from the TLB 530 in the example of FIG. 11, in other examples these types of caches could be combined into a single lookup cache structure. The granule protection information defines information restricting the physical address spaces from which a given physical address can be accessed, and based on this lookup the PAS filter 540 determines whether to allow the memory access request to proceed to be issued to one or more caches 510 and/or lower levels of cache/main memory. If the specified PAS for the memory access request is not allowed to access the specified physical address, then the PAS filter 540 blocks the transaction and may signal a fault.

Figure 12:
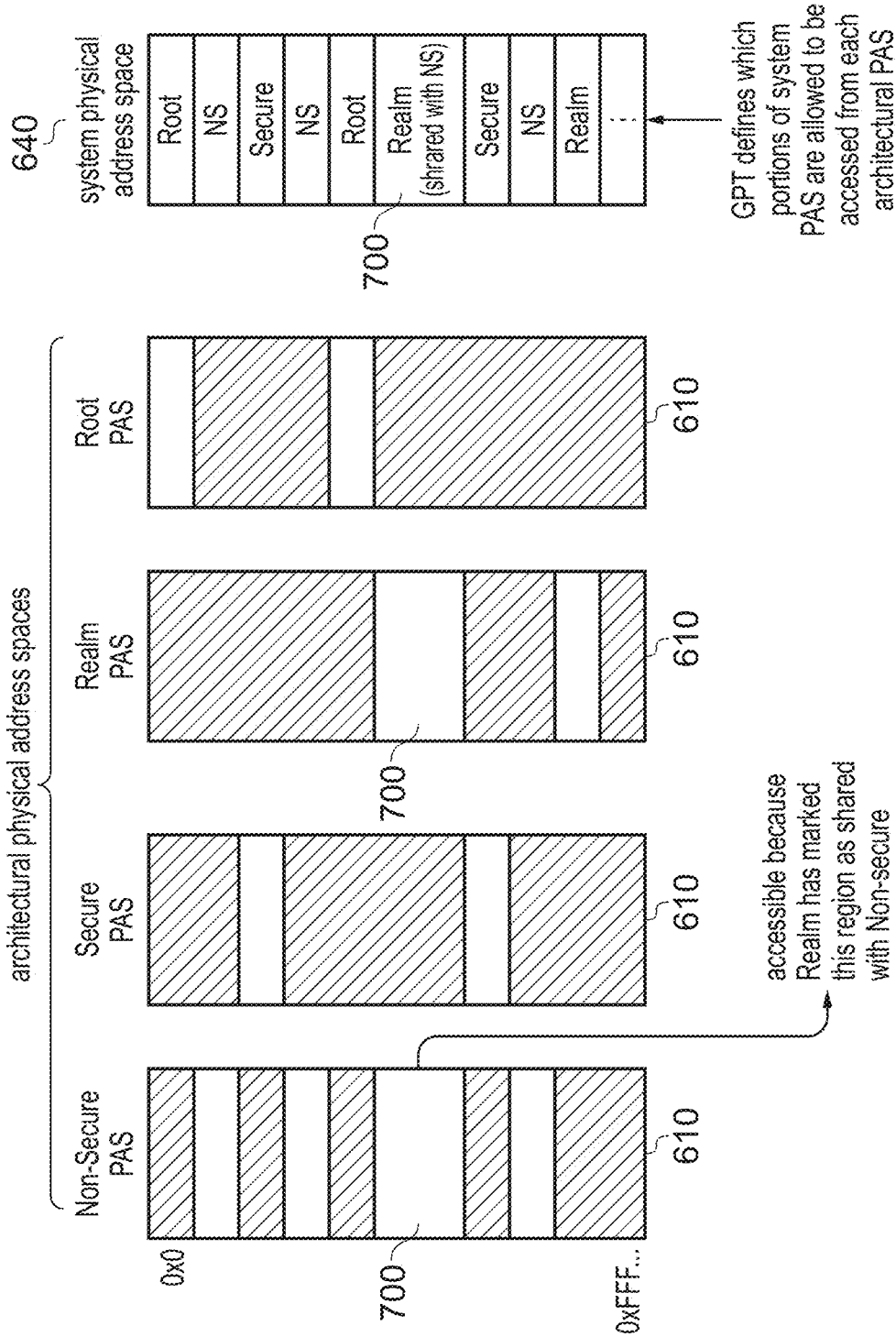
FIG. 12 schematically illustrates an example of partitioning the effective hardware physical address space so that different architectural physical address spaces have access to respective portions of the system physical address space.

FIG. 12 illustrates how the system physical address space 640 can be divided, using a granule protection table, into chunks allocated for access within a particular architectural physical address space (PAS) 610. The granule protection table (GPT) defines which portions of the system physical address space 640 are allowed to be accessed from each architectural physical address space 610. For example the GPT may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 12 the region 700 of the realm PAS is defined in the GPT as being assigned to the realm domain, so normally it would be inaccessible from the non-secure domain because the non-secure domain cannot select the realm PAS for its access requests. As the non-secure domain cannot access the realm PAS, then normally non-secure code could not see the data in region 700. However, if the realm temporarily wishes to share some of its data in its assigned regions of memory with the non-secure domain then it could request that monitor code operating in the root domain updates the GPT to indicate that region 700 is to be shared with the non-secure domain, and this may make region 700 also be accessible from the non-secure PAS as shown on the left hand side of FIG. 12, without needing to change which domain is the assigned domain for region 700. If the realm domain has designated a region of its address space as shared with the non-secure domain, then although the memory access requests targeting that region which are issued from the non-secure domain may initially specify the non-secure PAS, the PAS filter 540 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

The techniques described herein may for example be employed within either the GPI cache 550, the TLB 530, or indeed within both. Within the GPI cache 550, the invalidation requests received by that cache will typically be physical address based invalidation requests. In particular, in one example implementation, each invalidation request received by the GPI cache may specify a physical address, an invalidation size and an invalidation operation, and the cache invalidation circuitry is arranged to select whether to perform an entry-driven invalidation or an invalidation-range-driven invalidation.

With regards to the TLB 530, there are a wide variety of different invalidation operations that may be performed in respect of the TLB, such invalidation operations also being referred to as translation maintenance operations (TMOs). Some TMOs may be physical address based, where a physical address and an invalidation size are provided. In such cases, the selection between the entry-driven invalidation mode and the invalidation-range-driven invalidation mode may be performed on the basis of that physical address. However, other TMOs may be virtual address based. For virtual address (VA) based TMOs, selection of the invalidation mode may be based on the address invalidation range, cache occupancy information and entry size information encoding translation granule (TG) size information and level hint information, if available. As discussed earlier, entry size information may be used to define the scope of entries to be invalidated, translation granule (TG) size information may identify the translation granule size for the address translations that are to be invalidated (with the translation granule size in bytes being used in determining the address range), and translation table level hint information may indicate the lookup level of the translation table walk process that holds the final level descriptor used to determine a physical address from a corresponding virtual address. Often the final level descriptor is a leaf descriptor provided at a final level of the page table walk, but in some cases a block descriptor (at a non-final level of the page table walk) may form the final level descriptor (typically such a block descriptor being associated with a larger address range than a leaf descriptor).

Figure 13:
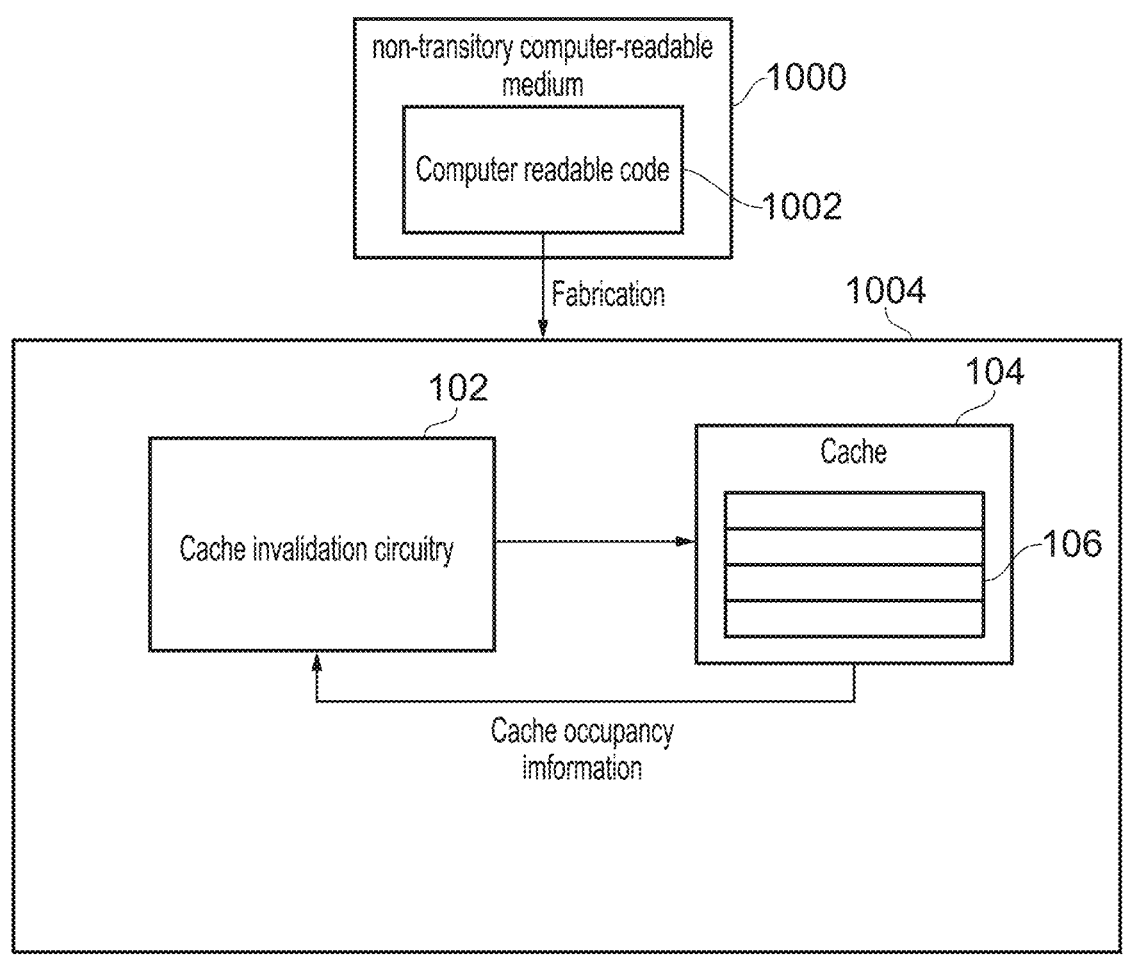
FIG. 13 schematically illustrates a non-transitory computer-readable medium comprising computer readable code for fabrication of an apparatus according to various configurations of the present techniques.

FIG. 13 schematically illustrates a non-transitory computer-readable medium comprising computer readable code for fabrication of an apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 may in one example implementation comprise the cache 104 comprising entry sets 106, and cache invalidation circuitry 102 as described in FIG. 1.

In brief overall summary there is provided an apparatus, medium and method for cache invalidation. The apparatus comprises a cache having a plurality of entries grouped into a plurality of entry sets. Each entry of the plurality of entries identifies an address range having one of a plurality of predetermined address range sizes. The apparatus further comprises cache invalidation circuitry responsive to a cache invalidation request indicating an address invalidation range to trigger invalidation of entries in the cache that overlap the address invalidation range. The cache invalidation circuitry is configured to operate in one of a plurality of invalidation modes based on the address invalidation range and cache occupancy information indicating address range sizes identified by the plurality of entries in the cache. The plurality of invalidation modes comprise, an entry-driven invalidation mode in which the cache invalidation circuitry is configured, for each entry of the plurality of entries and in response to a determination that the address invalidation range overlaps the address range identified by that entry, to invalidate that entry: and an invalidation-range-driven invalidation mode in which the cache invalidation circuitry is configured to generate a set of address range sizes based on the address range sizes indicated in the cache occupancy information and, for each given address range size, to generate one or more cache indexes from the address invalidation range in dependence on the given address range size, each of the cache indexes identifying a corresponding entry set of the plurality of entry sets, and for each corresponding entry set to invalidate entries in dependence on whether the address range identified by those entries overlaps the address invalidation range.

Some example configurations are set out in the following clauses:

Clause 1. An apparatus comprising:
  a cache comprising a plurality of entries grouped into a plurality of entry sets, each of the plurality of entry sets comprising one or more of the plurality of entries, wherein each entry of the plurality of entries identifies an address range having a corresponding address range size of a plurality of predetermined address range sizes;
  cache invalidation circuitry responsive to a cache invalidation request indicating an address invalidation range to trigger invalidation of entries in the cache that overlap the address invalidation range, wherein the cache invalidation circuitry is configured to operate in an invalidation mode of a plurality of invalidation modes and to perform a selection of the invalidation mode based on the address invalidation range and cache occupancy information indicating which address range sizes of the plurality of predetermined address range sizes are identified by the plurality of entries in the cache, wherein the plurality of invalidation modes comprise:
    an entry-driven invalidation mode in which the cache invalidation circuitry is configured, for each entry of the plurality of entries and in response to a determination that the address invalidation range overlaps the address range identified by that entry, to invalidate that entry, and
    an invalidation-range-driven invalidation mode in which the cache invalidation circuitry is configured to generate a set of address range sizes based on the address range sizes indicated in the cache occupancy information and, for each given address range size of the set of address range sizes, to generate one or more cache indexes from the address invalidation range in dependence on the given address range size, each of the cache indexes identifying a corresponding entry set of the plurality of entry sets, and for each corresponding entry set to invalidate one or more entries of the corresponding entry set in dependence on whether the address range identified by those entries overlaps the address invalidation range.

Clause 2. The apparatus of clause 1, wherein the set of address range sizes comprises each address range size indicated in the cache occupancy information.

Clause 3. The apparatus of clause 1, wherein:
  the cache invalidation request comprises invalidation entry size information identifying a subset of the plurality of predetermined address range sizes for which invalidation is to be triggered;
  the set of address range sizes comprises each given address range size indicated in both of the cache occupancy information and the invalidation entry size information.

Clause 4. The apparatus of any preceding clause, wherein the cache invalidation circuitry is configured, when operating in the invalidation-range-driven invalidation mode and when generating the one or more cache indexes, for each given address range size of the set of address range sizes:
  to generate a plurality of contiguous address ranges each having the given address range size, wherein the plurality of contiguous address ranges includes at least all addresses in the address invalidation range; and
  to generate as the one or more cache indexes generated in dependence on the given address range size, a cache index for each of the plurality of contiguous address ranges Clause 5. The apparatus of any preceding clause, wherein the invalidation mode selection circuitry is configured to perform the selection by:
  estimating a number of cache indexes required for operating using the invalidation-range-driven invalidation mode; and
  determining the invalidation mode based on a comparison between the number of cache indexes and a number of entry sets in the plurality of entry sets.

Clause 6. The apparatus of clause 5, wherein the number of entry sets in the plurality of entry sets is equal to a total number of entry sets in the cache.

Clause 7. The apparatus of clause 5 or clause 6, wherein the invalidation mode selection circuitry is responsive to the number of cache indexes and the number of entry sets meeting a predetermined condition, to select the entry-driven invalidation mode.

Clause 8. The apparatus of clause 7, wherein the invalidation mode selection circuitry is responsive to the number of cache indexes and the number of entry sets not meeting the predetermined condition, to select the invalidation-range-driven invalidation mode.

Clause The apparatus of clause 7 or clause 8, wherein the predetermined condition is met when a performance metric calculated assuming operation in the entry-driven invalidation mode for the number of entry sets exceeds the performance metric calculated assuming operation in the invalidation-range-driven invalidation mode for the number of cache indexes.

Clause 10. The apparatus of clause 9, wherein the performance metric is indicative of performance of the apparatus when performing invalidation required by the cache invalidation request and comprises at least one of:
  a power usage when performing the invalidation;
  a number of clock cycles used to perform the invalidation; and
  a total processing time used to perform the invalidation.

Clause 11. The apparatus of clause 7 or clause 8, wherein the predetermined condition is met when the number of cache indexes exceeds the number of entry sets.

Clause 12. The apparatus of any of clauses 5 to 11, wherein the cache invalidation circuitry is configured, when estimating the number of cache indexes:
  for each given address range size indicated in the set of address range sizes, to determine a corresponding number of contiguous address ranges of the given address range size required to include all addresses in the address invalidation range, and
  to estimate the number of cache indexes as a sum of the corresponding number of contiguous address ranges for each given address range size.

Clause 13. The apparatus of clause 12, wherein:
  the apparatus comprises one or more look up tables arranged to store, for a given address invalidation range, information identifying the corresponding number of contiguous address ranges for each of the plurality of predetermined address range sizes; and
  the cache invalidation circuitry is configured to determine the corresponding number of contiguous address ranges by performing a lookup in at least one of the one or more look up tables and excluding the corresponding number of contiguous address ranges for each of the plurality of predetermined address range sizes that is not included in the set of address range sizes.

Clause 14. The apparatus of any preceding clause, wherein the cache invalidation circuitry is configured, when operating in the invalidation-range-driven invalidation mode, for each given address range size indicated in the set of address range sizes and for each corresponding entry set, to invalidate any entry whose identified address range overlaps the address invalidation range.

Clause 15. The apparatus of any preceding clause, wherein the cache is a memory management unit cache.

Clause 16. The apparatus of any preceding clause, wherein each entry provides access control information used to constrain access to the address range identified by that entry.

Clause 17. The apparatus of clause 16, further comprising:
  address translation circuitry to translate a target virtual address specified by a memory access request into a target physical address associated with a selected physical address space selected from among a plurality of physical address spaces; and
  a given entry stored in the cache comprises granule protection information indicating, for at least one granule of physical addresses, which of the plurality of physical address spaces is allowed access to the at least one granule of physical addresses.

Clause 18. The apparatus of any of clauses 1 to 15, wherein the address invalidation range indicates a range of virtual addresses and each entry of the cache comprises translation information indicating a translation between a block of virtual addresses and a corresponding block of physical addresses.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. An apparatus comprising:
  a cache comprising a plurality of entries grouped into a plurality of entry sets, each of the plurality of entry sets comprising one or more of the plurality of entries, wherein each entry of the plurality of entries identifies an address range having a corresponding address range size of a plurality of predetermined address range sizes;
  cache invalidation circuitry responsive to a cache invalidation request indicating an address invalidation range to trigger invalidation of entries in the cache that overlap the address invalidation range, wherein the cache invalidation circuitry is configured to operate in an invalidation mode of a plurality of invalidation modes and to perform a selection of the invalidation mode based on the address invalidation range and cache occupancy information indicating which address range sizes of the plurality of predetermined address range sizes are identified by the plurality of entries in the cache, wherein the plurality of invalidation modes comprise:
    an entry-driven invalidation mode in which the cache invalidation circuitry is configured, for each given entry of the plurality of entries, to perform a determination of whether the given entry identifies an address range that overlaps the address invalidation range, and in response to the determination indicating that the address invalidation range overlaps the address range identified by the given entry, to invalidate the given entry; and
    an invalidation-range-driven invalidation mode in which the cache invalidation circuitry is configured to generate a set of address range sizes based on the address range sizes indicated in the cache occupancy information and, for each given address range size of the set of address range sizes, to generate one or more cache indexes from the address invalidation range in dependence on the given address range size, each of the generated cache indexes identifying a corresponding entry set of the plurality of entry sets, and for each corresponding entry set to invalidate one or more entries of the corresponding entry set in dependence on whether the address range identified by those entries overlaps the address invalidation range.

2. The apparatus of claim 1, wherein the set of address range sizes comprises each address range size indicated in the cache occupancy information.

3. The apparatus of claim 1, wherein:
  the cache invalidation request comprises invalidation entry size information identifying a subset of the plurality of predetermined address range sizes for which invalidation is to be triggered;

the set of address range sizes comprises each given address range size indicated in both of the cache occupancy information and the invalidation entry size information.

4. The apparatus of claim 1, wherein the cache invalidation circuitry is configured, when operating in the invalidation-range-driven invalidation mode and when generating the one or more cache indexes, for each given address range size of the set of address range sizes:
to generate a plurality of contiguous address ranges each having the given address range size, wherein the plurality of contiguous address ranges includes at least all addresses in the address invalidation range; and
to generate as the one or more cache indexes generated in dependence on the given address range size, a cache index for each of the plurality of contiguous address ranges.

5. The apparatus of claim 1, wherein the invalidation mode selection circuitry is configured to perform the selection by:
estimating a number of cache indexes required for operating using the invalidation-range-driven invalidation mode; and
determining the invalidation mode based on a comparison between the number of cache indexes and a number of entry sets in the plurality of entry sets.

6. The apparatus of claim 5, wherein the number of entry sets in the plurality of entry sets is equal to a total number of entry sets in the cache.

7. The apparatus of claim 5, wherein the invalidation mode selection circuitry is responsive to the number of cache indexes and the number of entry sets meeting a predetermined condition, to select the entry-driven invalidation mode.

8. The apparatus of claim 7, wherein the invalidation mode selection circuitry is responsive to the number of cache indexes and the number of entry sets not meeting the predetermined condition, to select the invalidation-range-driven invalidation mode.

9. The apparatus of claim 7, wherein the predetermined condition is met when a performance metric calculated assuming operation in the entry-driven invalidation mode for the number of entry sets exceeds the performance metric calculated assuming operation in the invalidation-range-driven invalidation mode for the number of cache indexes.

10. The apparatus of claim 9, wherein the performance metric is indicative of performance of the apparatus when performing invalidation required by the cache invalidation request and comprises at least one of:
a power usage when performing the invalidation;
a number of clock cycles used to perform the invalidation; and
a total processing time used to perform the invalidation.

11. The apparatus of claim 7, wherein the predetermined condition is met when the number of cache indexes exceeds the number of entry sets.

12. The apparatus of claim 5, wherein the cache invalidation circuitry is configured, when estimating the number of cache indexes:
for each given address range size indicated in the set of address range sizes, to determine a corresponding number of contiguous address ranges of the given address range size required to include all addresses in the address invalidation range; and
to estimate the number of cache indexes as a sum of the corresponding number of contiguous address ranges for each given address range size.

13. The apparatus of claim 12, wherein:
the apparatus comprises one or more look up tables arranged to store, for a given address invalidation range, information identifying the corresponding number of contiguous address ranges for each of the plurality of predetermined address range sizes; and
the cache invalidation circuitry is configured to determine the corresponding number of contiguous address ranges by performing a lookup in at least one of the one or more look up tables and excluding the corresponding number of contiguous address ranges for each of the plurality of predetermined address range sizes that is not included in the set of address range sizes.

14. The apparatus of claim 1, wherein the cache invalidation circuitry is configured, when operating in the invalidation-range-driven invalidation mode, for each given address range size indicated in the set of address range sizes and for each corresponding entry set, to invalidate any entry whose identified address range overlaps the address invalidation range.

15. The apparatus of claim 1, wherein the cache is a memory management unit cache.

16. The apparatus of claim 1, wherein each entry provides access control information used to constrain access to the address range identified by that entry.

17. The apparatus of claim 16, further comprising:
address translation circuitry to translate a target virtual address specified by a memory access request into a target physical address associated with a selected physical address space selected from among a plurality of physical address spaces; and
a given entry stored in the cache comprises granule protection information indicating, for at least one granule of physical addresses, which of the plurality of physical address spaces is allowed access to the at least one granule of physical addresses.

18. The apparatus of any of claim 1, wherein the address invalidation range indicates a range of virtual addresses and each entry of the cache comprises translation information indicating a translation between a block of virtual addresses and a corresponding block of physical addresses.

19. A method of operating an apparatus comprising a cache configured to store a plurality of entries grouped into a plurality of entry sets, each of the plurality of entry sets comprising one or more of the plurality of entries, wherein each entry of the plurality of entries identifies an address range having a corresponding address range size of a plurality of predetermined address range sizes, the method comprising:
in response to a cache invalidation request indicating an address invalidation range, triggering invalidation of entries in the cache that overlap the address invalidation range in an invalidation mode of a plurality of invalidation modes and performing a selection of the invalidation mode based on the address invalidation range and cache occupancy information indicating which address range sizes of the plurality of predetermined address range sizes are identified by the plurality of entries in the cache, wherein the plurality of invalidation modes comprise:
an entry-driven invalidation mode comprising, for each given entry of the plurality of entries, performing a determination of whether the given entry identifies an address range that overlaps the address invalidation range, and in response to the determination indicating that the address invalidation range overlaps the address range identified by the given entry, invalidating the given entry; and an invalidation-range-driven invalidation mode comprising generating a set of address range sizes based on the address range sizes indicated in the cache occupancy information and, for each given address range size of the set of address range sizes, generating one or more cache indexes from the address invalidation range in dependence on the given address range size, each of the generated cache indexes identifying a corresponding entry set of the plurality of entry sets, and for each corresponding entry set invalidating one or more entries of the corresponding entry set in dependence on whether the address range identified by those entries overlaps the address invalidation range.

20. A non-transitory computer-readable medium to store computer-readable code for fabrication of an apparatus comprising:

cache configured to store a plurality of entries grouped into a plurality of entry sets, each of the plurality of entry sets comprising one or more of the plurality of entries, wherein each entry of the plurality of entries identifies an address range having a corresponding address range size of a plurality of predetermined address range sizes;

cache invalidation circuitry responsive to a cache invalidation request indicating an address invalidation range to trigger invalidation of entries in the cache that overlap the address invalidation range, wherein the cache invalidation circuitry is configured to operate in an invalidation mode of a plurality of invalidation modes and to perform a selection of the invalidation mode based on the address invalidation range and cache occupancy information indicating which address range sizes of the plurality of predetermined address range sizes are identified by the plurality of entries in the cache, wherein the plurality of invalidation modes comprise:

an entry-driven invalidation mode in which the cache invalidation circuitry is configured, for each given entry of the plurality of entries, to perform a determination of whether the given entry identifies an address range that overlaps the address invalidation range, and in response to the determination indicating that the address invalidation range overlaps the address range identified by the given entry, to invalidate the given entry; and an invalidation-range-driven invalidation mode in which the cache invalidation circuitry is configured to generate a set of address range sizes based on the address range sizes indicated in the cache occupancy information and, for each given address range size of the set of address range sizes, to generate one or more cache indexes from the address invalidation range in dependence on the given address range size, each of the generated cache indexes identifying a corresponding entry set of the plurality of entry sets, and for each corresponding entry set to invalidate one or more entries of the corresponding entry set in dependence on whether the address range identified by those entries overlaps the address invalidation range.

* * * * *